United States Patent
Wang et al.

(10) Patent No.: US 10,136,002 B2
(45) Date of Patent: Nov. 20, 2018

(54) CLOUD-BASED DOCUMENT QUALITY ASSURANCE

(71) Applicant: KYOCERA Document Solutions Inc., Osaka (JP)

(72) Inventors: Hui Wang, Temple City, CA (US); Leonard Cayetano, Kirkland, WA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/364,915

(22) Filed: Nov. 30, 2016

(65) Prior Publication Data

US 2018/0152565 A1    May 31, 2018

(51) Int. Cl.
| | |
|---|---|
| H04N 1/00 | (2006.01) |
| H04N 1/32 | (2006.01) |
| G06K 9/00 | (2006.01) |
| G06K 9/62 | (2006.01) |
| G06K 15/02 | (2006.01) |

(52) U.S. Cl.
CPC ..... *H04N 1/00039* (2013.01); *G06K 9/00442* (2013.01); *G06K 9/6202* (2013.01); *G06K 15/1836* (2013.01); *H04N 1/00005* (2013.01); *H04N 1/00015* (2013.01); *H04N 1/00061* (2013.01); *H04N 1/00079* (2013.01); *H04N 1/00323* (2013.01); *H04N 1/00344* (2013.01); *H04N 1/32122* (2013.01); *G06K 2009/6213* (2013.01); *H04N 2201/0094* (2013.01); *H04N 2201/3242* (2013.01); *H04N 2201/3284* (2013.01)

(58) Field of Classification Search
USPC .................................................. 358/1.1–3.29
See application file for complete search history.

(56) References Cited

U.S. PATENT DOCUMENTS

| | | | | |
|---|---|---|---|---|
| 6,002,814 | A | * | 12/1999 | Chadez .................. G06K 15/02 358/1.15 |
| 6,952,485 | B1 | * | 10/2005 | Davidson .............. G06T 1/0071 358/3.28 |
| 7,206,099 | B2 | * | 4/2007 | Brewington ....... H04N 1/40006 345/589 |
| 7,626,732 | B2 | * | 12/2009 | Grinberg ............. B41F 33/0027 358/1.1 |

(Continued)

FOREIGN PATENT DOCUMENTS

| | | |
|---|---|---|
| JP | 2004-021459 A | 1/2004 |
| JP | 2004-151885 A | 5/2004 |

*Primary Examiner* — Marcellus Augustin
(74) *Attorney, Agent, or Firm* — McDonnell Boehnen Hulbert & Berghoff LLP

(57) ABSTRACT

The present disclosure relates to cloud-based document quality assurance. One example embodiment includes a method for evaluating document quality. The method includes receiving, by a cloud server, document data associated with an image forming device. The method also includes accessing, by the cloud server, a cloud service. Further, the method includes performing, by the cloud service, a data-segment comparison between the document data and reference document data from a quality assurance database. In addition, the method includes generating, by the cloud service, a quality assurance report based on the data-segment comparison between the document data and the reference document data.

20 Claims, 14 Drawing Sheets

(56) References Cited

U.S. PATENT DOCUMENTS

| | | | | |
|---|---|---|---|---|
| 8,879,120 B2* | 11/2014 | Thrasher | ............... | H04N 1/387 |
| | | | | 358/1.9 |
| 2001/0025338 A1* | 9/2001 | Zumkehr | ............. | G06F 9/3861 |
| | | | | 712/228 |
| 2006/0218135 A1* | 9/2006 | Bisson | .............. | G06F 17/30368 |
| 2009/0059266 A1* | 3/2009 | Jackson | ............ | H04N 1/00002 |
| | | | | 358/1.14 |
| 2011/0016091 A1* | 1/2011 | Prahlad | .............. | G06F 11/1453 |
| | | | | 707/654 |
| 2012/0092701 A1* | 4/2012 | Wang | .................. | H04N 1/6033 |
| | | | | 358/1.15 |
| 2013/0003119 A1* | 1/2013 | Yamaguchi | ............ | G06F 3/121 |
| | | | | 358/1.15 |
| 2013/0110744 A1* | 5/2013 | Hendley | ............... | G06Q 10/06 |
| | | | | 705/413 |
| 2013/0111335 A1* | 5/2013 | Tse | ....................... | G06F 3/1208 |
| | | | | 715/255 |
| 2014/0278448 A1* | 9/2014 | Sadeghi | ................ | G06Q 50/22 |
| | | | | 705/2 |

* cited by examiner

CLOUD-BASED DOCUMENT QUALITY ASSURANCE

BACKGROUND

Unless otherwise indicated herein, the materials described in this section are not prior art to the claims in this application and are not admitted to be prior art by inclusion in this section.

In recent years, various types of image forming devices (e.g., printing devices) have become popular for both business and consumer use. In addition to traditional black and white printers, color printers, scanners, copiers, fax machines, and other components are now common. Multi-functional products (MFPs), that support two or more of these operations, are also widely available.

During the processing (e.g., printing) of documents by image forming devices, quality assurance (QA) may be performed at various stages to ensure that associated document data is being correctly processed. QA may include a QA tester or QA engineer manually reviewing the document data to evaluate its accuracy. Such a manual review process may be time consuming. Further, a manual review is subject to human inaccuracy.

SUMMARY

The specification and drawings disclose embodiments that relate to cloud-based document quality assurance.

In a first aspect, the disclosure describes a method for evaluating document quality. The method includes receiving, by a cloud server, document data associated with an image forming device. The method also includes accessing, by the cloud server, a cloud service. The method further includes performing, by the cloud service, a data-segment comparison between the document data and reference document data from a quality assurance database. In addition, the method includes generating, by the cloud service, a quality assurance report based on the data-segment comparison between the document data and the reference document data.

In a second aspect, the disclosure describes a cloud service for evaluating document quality. The cloud service includes a cloud service interface. The cloud service interface is configured to communicate with a cloud server to receive document data associated with an image forming device. The cloud service also includes a cloud quality assurance handler. The cloud quality assurance handler comprises an image processing engine configured to compare the document data with reference document data from a quality assurance database. The image processing engine includes an image processing unit configured to modify the document data, if necessary, such that a byte-wise comparison between the document data and the reference document data can be made. The image processing engine also includes a byte comparator configured to perform the byte-wise comparison between the document data and the reference document data. The cloud service interface is further configured to communicate a result of the byte-wise comparison to the cloud server as a quality assurance report.

In a third aspect, the disclosure describes a system for evaluating document quality. The system includes an image forming device configured to process document data. The system also includes a cloud server configured to receive document data associated with the image forming device. Further, the system includes a cloud service, accessible by the cloud server. The cloud service is configured to perform a data-segment comparison between the document data and reference document data from a quality assurance database. The cloud service is also configured to generate a quality assurance report based on the data-segment comparison between the document data and reference document.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
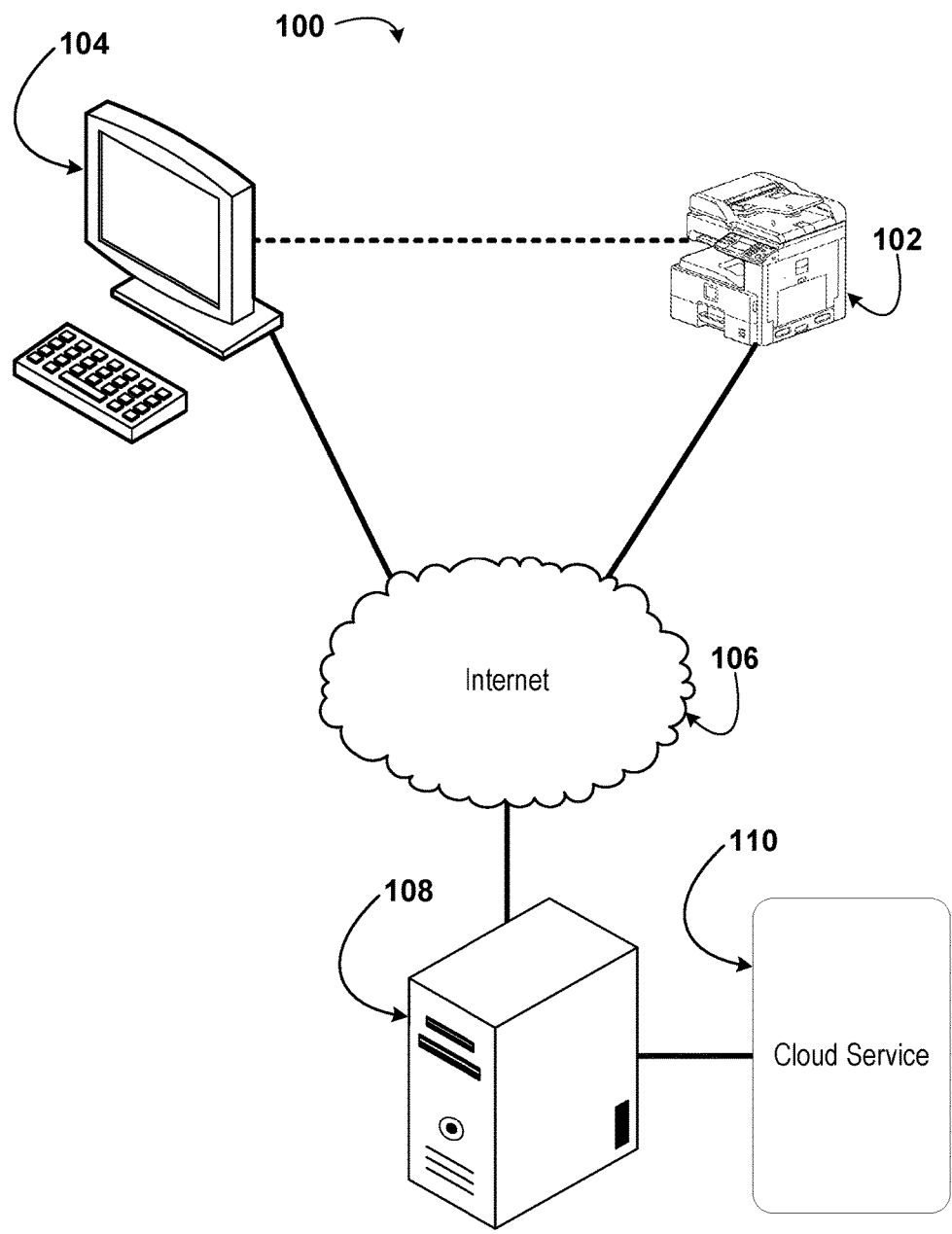
FIG. 1 is an illustration of an image forming system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments may relate to methods, cloud services, and systems for evaluating document quality.

One example includes a method for evaluating document quality performed by an image forming system. The image forming system may include an image forming device (e.g., a printer), a terminal device (e.g., a personal computing device), and a cloud server with an associated cloud service. The components of the image forming system may communicate with one another over a network (e.g., the public Internet).

The method may include the image forming device transmitting document data to the cloud server. The document data may correspond to a document to be printed by the image forming device. Further, the document data may correspond to various stages within a printing pipeline of the image forming device. For example, the document data may correspond to an interpretation stage, a graphic execution stage, a rasterization stage, a halftone stage, or a printed stage. Upon receiving the document data, the cloud server may store the document data within a memory of the cloud server (e.g., within a non-volatile memory of the cloud server).

The method may also include accessing the associated cloud service by the cloud server. The cloud service may be a set of instructions, executable by a processing device, stored within the cloud server. Alternatively, the cloud service may be a service hosted by other cloud devices (e.g., other cloud servers) that is accessible by the cloud server that received the document data. The cloud server accessing the associated cloud service may include the cloud server sending the document data to a cloud quality assurance handler within the associated cloud service to be evaluated.

Further, the method may include the associated cloud service performing a data-segment comparison (e.g., bytewise comparison) between the document data and reference document data. In some embodiments, the data-segment comparison may be performed by the cloud quality assurance handler. The reference document data may be stored in a quality assurance database. The quality assurance database may be stored within a memory of the cloud server, for example. In addition, the reference document data may represent a model document against which the document data transmitted by the image forming device may be compared. For example, the reference document data may have previously been received from the image forming device prior to a firmware update. In such cases, the document data received from the image forming device (from after a firmware update) can be compared to reference document data from before a firmware update, to ensure the firmware update did not disrupt the quality of the printing pipeline.

The method may additionally include the cloud service generating a quality assurance report based on the data-segment comparison between the document data and the reference document data. The quality assurance report may indicate the degree to which the document data differs from the reference document data, if at all. The quality assurance report may be stored in the cloud server. In addition, the quality assurance report may be transmitted to the image forming device and/or the terminal device where it can be used to modify settings within those devices to correct for any errors within the printing pipeline.

II. Example Systems

FIG. 1 is an illustration of an image forming system 100, according to example embodiments. The image forming system 100 may include an image forming device 102, a terminal device 104, an internet 106, a cloud server 108, and a cloud service 110.

The image forming device 102 is configured to reproduce digital data (e.g., by printing the digital data). In some embodiments, this may include a two-dimensional (2D) print onto paper using ink. Additionally or alternatively, reproducing digital data may include three-dimensional (3D) printing. In addition to printing, the image forming device 102 may be configured to perform other tasks, such as scanning or faxing, as is the case when the image forming device 102 is a multi-functional peripheral (MFP).

The terminal device 104 is a device that may be configured to take input commands from a user (e.g., a quality assurance tester) and communicate those commands to the image forming device 102 or the cloud server 108. The terminal device 104 may communicate with the image forming device 102 and the cloud server 108 through the internet 106 (e.g., the public Internet), as illustrated. Additionally, the terminal device 104 may, in some embodiments, communicate with the image forming device 102 locally, such as over a local area network (LAN) or wide area network (WAN). This communication may take place wirelessly (e.g., using Bluetooth® or Wi-Fi, IEEE 802.11 standards) or via wireline connection (e.g., a universal serial bus, USB, connection or an Ethernet connection), in various embodiments.

The terminal device 104 may be selected from among a variety of different devices. The terminal device 104 may be a personal computer (PC), as illustrated, in some embodiments. Alternatively, the terminal device 104 may be a tablet computing device or a mobile computing device (e.g., mobile phone). Further, in some embodiments, the image forming system 100 may include more than one terminal device. For example, the image forming system 100 may include a first terminal device in the form of a PC and a second terminal device in the form of a tablet computing device.

The cloud server 108 may be a server that facilitates interaction between the terminal device 104 and/or the image forming device 102 and the cloud service 110. Further, the cloud server 108 may contain a memory. The memory may be a non-transitory, computer-readable medium that includes a volatile memory, such as a random access memory (RAM), and/or a non-volatile memory, such as a read-only memory (ROM). The memory may store instructions, executable by a processer of the cloud server 108, to communicate with the terminal device 104 and/or the image forming device 102 over the internet 106. Additionally or alternatively, such a memory may store instructions, executable by a processor of the cloud server, to perform the operations of the cloud service 110. In other words, in some embodiments, the cloud service 110 may represent software internal to the cloud server, rather than a component external to the cloud server 108. Even further, such a memory may store data for use by the cloud service 110 (e.g., reference document data for use by a byte-wise comparator during a quality assurance process or technical specifications about the image forming device 102 that indicate its image forming capabilities).

The cloud service 110 may be a subscription service associated with the cloud server 108. Alternatively, the cloud service 110 may be spread across multiple cloud servers or devices. For example, the cloud service 110 may be executed by processing units spread across multiple cloud servers according to multiple sets of instructions stored within memories of the corresponding multiple cloud servers.

The terminal device 104 and/or the image forming device 102 may have credentials (e.g., a user identification, ID, as well as an associated password) used to authenticate the respective device before logging into the cloud service 110. Within the cloud service 110, there may be an association between the terminal device 104 and the image forming device 102. For example, the cloud service 110 may permit the terminal device 104 to access information about the image forming device 102 using the cloud service 110, and vice versa. Further, the terminal device 104 may permit requests originating from the terminal device 104 (e.g., printing requests or quality assurance test requests) to be transmitted to and/or executed on the image forming device 102.

The cloud server 108 and the cloud service 110 may be located on a public or private cloud. For example, in some embodiments, the cloud service 110 may be implemented using Microsoft Azure™ or Citrix XenServer®.

Figure 2:
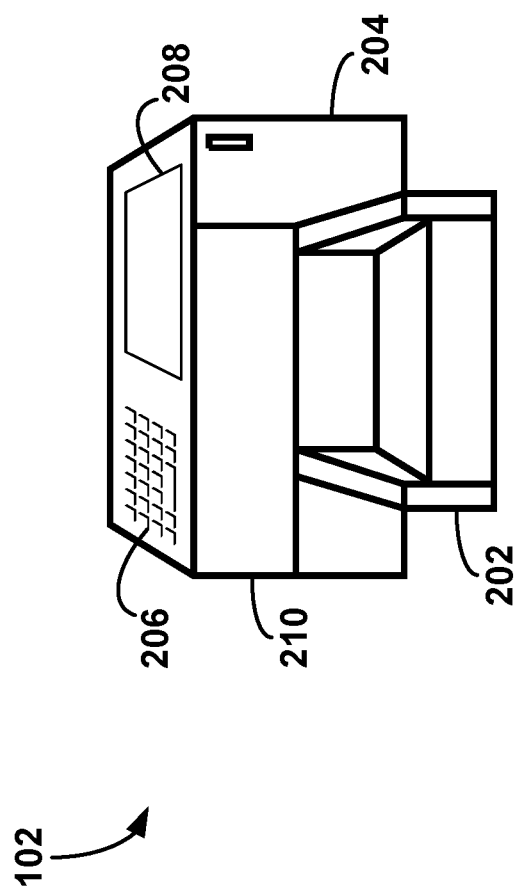
FIG. 2 is an illustration of an image forming device, according to example embodiments.

FIG. 2 depicts an example image forming device 102. The image forming device 102 may be configured to print partially-stored and/or fully-stored electronic documents on various types of physical output media. These output media include, but are not limited to, various sizes and types of paper, overhead transparencies, and so on. The image forming device 102 may be interchangeably referred to as a "printer", a "printing device", a "printing apparatus", an "image forming apparatus", an "image processing apparatus", an "image processing device", etc.

The image forming device 102 may serve as a local peripheral to a terminal device 104, such as a personal computer. In these cases, the image forming device 102 may be attached to the terminal device 104 by cable, such as a serial port cable, parallel port cable, Universal Serial Bus (USB) cable, FireWire® (IEEE 1394) cable, or High-Definition Multimedia Interface (HDMI) cable. Thus, the terminal device 104 may serve as a source of electronic documents (e.g., in the form of document data) for the image forming device 102.

Additionally or alternatively, the image forming device 102 may include a wireline or wireless network interface, such as an Ethernet or Wi-Fi (IEEE 802.11 standards) interface. So arranged, the image forming device 102 may serve as an image forming device for any number of terminal devices that can communicate with the image forming device 102 over a network. In some embodiments, the image forming device 102 may serve as both a local peripheral and a networked printer at the same time. In order to use the image forming device 102, terminal devices may install one or more drivers. These drivers may include software that converts electronic documents to be printed from various local representations, stored on the terminal devices, to one or more representations supported by the image forming device 102.

Regardless, the image forming device 102 may comprise a computing device, and may carry out both printing-related and non-printing related tasks. For instance, the image forming device 102 may also include copier, fax, and scanner functions (e.g., the image forming device 102 may be a multi-functional product, MFP). In some embodiments, the image forming device 102 may use a scanning unit to facilitate copier and/or fax functions. For instance, the image forming device 102 may scan a physical document into an electronic format, and then print the resulting electronic document to provide a copy, and/or transmit the resulting electronic document via a telephone interface to provide a fax operation. Additionally, the image forming device 102 may be able to receive a faxed electronic document via a telephone interface, and then compress and store a representation of this electronic document.

In order to support its various capabilities, the image forming device 102 may include a document feeder/output tray 202, a paper storage 204, a user interface 206, a scanning element 208, and a chassis 210. It is understood that image forming devices may take on a wide variety of forms. As such, the image forming device 102 may include more or fewer components than depicted in FIG. 2, and/or components arranged in a different fashion than depicted in FIG. 2.

The document feeder/output tray 202 may hold physical documents (e.g., a stack of one or more sheets of paper) that are to be scanned, copied, or faxed. The document feeder/output tray 202 may allow the image forming device 102 to automatically feed multiple physical documents for processing by the image forming device 102 without requiring manual intervention. The document feeder/output tray 202 may also include one or more separate output trays for holding physical documents that have been processed by the image forming device 102. These may include physical documents that have been printed, scanned, copied, or faxed by the image forming device 102, as well as physical documents that have been produced by, e.g., the fax and/or copying functions of the image forming device 102.

Paper storage 204 may include trays and/or feeding elements for various types of physical media. For instance, paper storage 204 may include separate trays for 8.5×11 inch paper, A4 paper, letterhead paper, envelopes, and so on. For any operation of the image forming device 102 that involves outputting physical media (e.g., printing, copying, and/or receiving a fax), paper storage 204 may supply the physical media.

The user interface 206 may facilitate the interaction of the image forming device 102 with a human or non-human user, such as to receive input from a user and to provide output to the user. Thus, the user interface 206 may include input components such as a keypad, keyboard, touch-sensitive or presence-sensitive panel, joystick, microphone, still camera, and/or video camera. The user interface 206 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. The user interface 206 may also be configured to be able to generate audible output(s), via a speaker, speaker jack, audio output port, audio output device, earphones, and/or other similar devices, now known or later developed.

The scanning element 208 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with the image forming device 102.

The chassis 210 may include a physical housing that contains and/or interconnects various components of the image forming device 102, such as the document feeder/output tray 202, paper storage 204, the user interface 206, and the scanning element 208. Additionally, the chassis 210 may house other components not shown in FIG. 2. For example, the chassis 210 may contain one or more toner cartridges, liquid ink jets, belts, rollers, and/or power supplies. Further, the chassis 210 may include communication interfaces, such as a wireline and/or wireless network interfaces, a telephony interface (e.g., an RJ45 jack), a USB interface, a Bluetooth® interface, a card reader port, etc.

Figure 3:
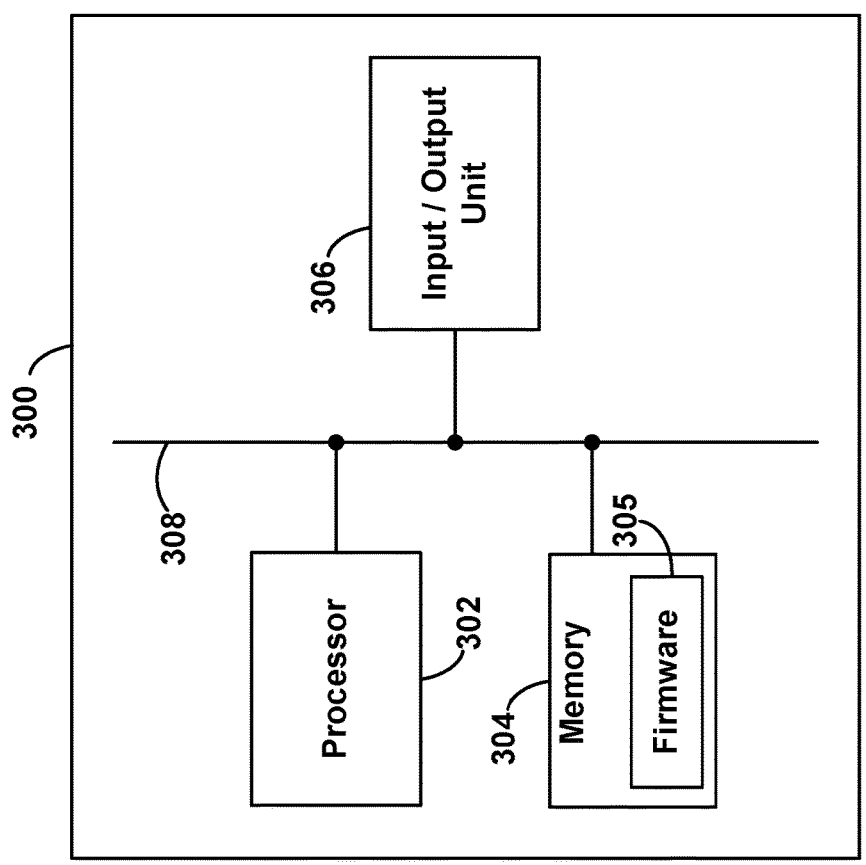
FIG. 3 is a schematic block diagram illustrating components of an image forming device, according to example embodiments.

Moreover, as the image forming device 102 may employ general-purpose and/or specially-designed computing device components, the chassis 210 may also house some or all of these components. To that point, FIG. 3 depicts an example embodiment 300 of computing device components (e.g., functional elements of a computing device) that may be included in the image forming device 102.

Computing device components 300 may include a processor 302, a memory 304, and an input/output unit 306, all of which may be coupled by a system bus 308 or a similar mechanism. The processor 302 may include one or more central processing units (CPUs), such as one or more general purpose processors and/or one or more dedicated processors (e.g., application specific integrated circuits (ASICs) or digital signal processors (DSPs)).

The memory 304, in turn, may comprise volatile and/or non-volatile data storage and can be integrated in whole or in part with the processor 302. The memory 304 may store program instructions, executable by the processor 302, and data that are manipulated by these instructions to carry out the various methods, processes, or functions described herein. Alternatively, these methods, processes, or operations can be defined by hardware, firmware, and/or any combination of hardware, firmware, and software. Therefore, memory 304 may include a tangible, non-transitory, computer-readable medium, having stored thereon program instructions that, upon execution by one or more processors 302, cause the respective devices to carry out any of the methods, processes, or functions disclosed in this specification or the accompanying drawings.

One set of instructions within the memory 304 may be firmware 305. The firmware 305 may contain instructions, executable by the processor 302, that enable the image forming device 102 to process documents or evaluate document quality in conjunction with other components of the image forming system 100. For example, some of the instructions contained within the firmware 305 may assist the image forming device 102 in printing documents sent to it by the terminal device 104. In addition, the firmware 305 may contain instructions, executable by the processor 302, to perform the method illustrated in FIG. 10 to evaluate document quality using a document quality assurance process.

The memory 304 may also be configured to store compressed and non-compressed electronic documents that may later be processed (e.g., printed or faxed), such as a document that represents a print job that is received by the image forming apparatus 102 and designates a future time for completion. Thus, the memory 304 may serve as an output medium for these electronic documents.

The input/output unit 306 may include any of the operations and/or elements described in reference to the user interface 206. Thus, the input/output unit 306 may serve to configure and/or control the operation of the processor 302. The input/output unit 306 may also provide output based on the operations performed by the processor 302.

Similar components to those illustrated in FIG. 3 may be included within the terminal device 104 or the cloud server 108, in various embodiments. In such embodiments, the memory 304 within the terminal device 104 and/or the cloud server 108 may not include the firmware 305.

Figure 4:
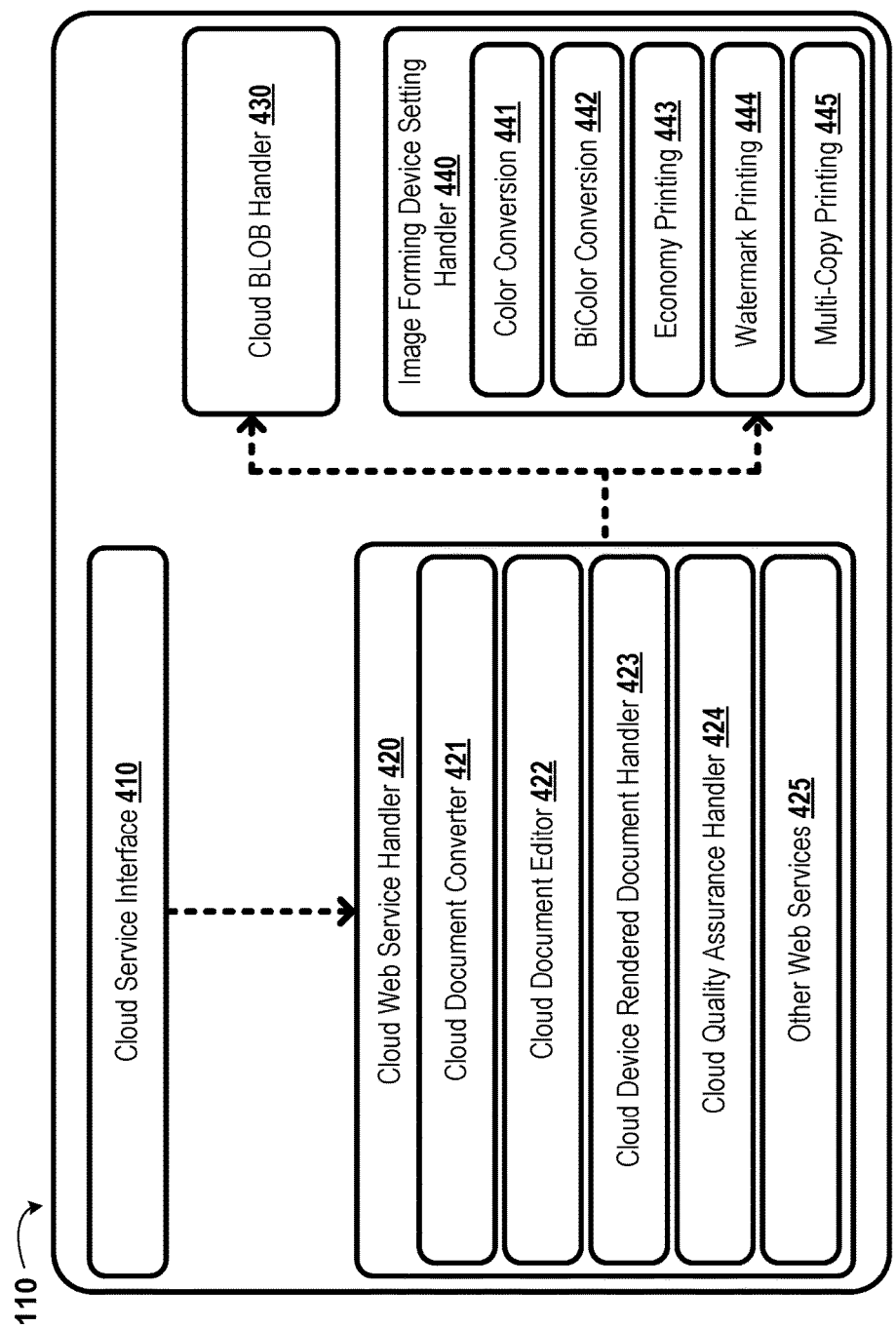
FIG. 4 is a schematic block diagram illustrating a cloud service, according to example embodiments.

FIG. 4 is a schematic block diagram illustrating the cloud service 110. The cloud service 110 may be associated with one or more cloud servers 108 as illustrated in FIG. 1. For example, the cloud service 110 may be a set of instructions stored within a memory of the cloud server 108 and executed by a processing unit of the cloud server 108. Further, the cloud server 108 may use the cloud service 110 to perform specific actions (e.g., communicating with a terminal device or an image forming device). The cloud service 110 may include a cloud service interface 410, a cloud web service handler 420, a cloud binary large object (BLOB) handler 430, and an image forming device setting handler 440.

The cloud service interface 410 may provide a set of instructions that, when executed by a processor, provide a mechanism for the cloud service 110 to interact with outside components. For example, the cloud service interface 410 may provide an access point for a terminal device (e.g., the terminal device 104 illustrated in FIG. 1) and/or an embedded software (e.g., the firmware 305 illustrated in FIG. 3 within the image forming device 102 illustrated in FIG. 1) to communicate with the cloud service 110. As indicated in FIG. 4, the cloud service interface 410 may communicate any data it receives with the cloud web service handler 420. Additionally, the cloud service interface 410 may receive data from the cloud web service handler 420 to be communicated to an external source. Such data may include document data or a quality assurance report, for example.

The cloud web service handler 420 may provide various web services for converting documents or evaluating document quality. The cloud web service handler 420 may provide web services for additional tasks, as well. In some embodiments, the cloud web service handler 420 may perform certain actions using the cloud BLOB handler 430 or the image forming device setting handler 440. In addition, the cloud web service handler 420 may receive information from or transmit information to external sources (e.g., an image forming device or a terminal device) through the cloud service interface 410. The cloud web service handler 420 may include, for example, a cloud document converter 421, a cloud document editor 422, a cloud device rendered document handler 423, a cloud quality assurance handler 424, and other web services 425.

The cloud document handler 421 may provide a set of instructions that, when executed by a processor, convert document data received by the cloud web service handler 420 from the cloud service interface 410. For example, the cloud document handler 421 may change a format of document data received from an image forming device or a terminal device from one format to another (e.g., from a Portable Document Format, PDF, to a proprietary format used by an image forming device for printing the document data). In another example, the cloud document converter 421 may compress document data prior to the document data being stored in a cloud server (e.g., the cloud server 108 illustrated in FIG. 1). In addition, the cloud document converter 421 may perform a color conversion or a bicolor conversion using the image forming device setting handler 440.

The cloud document editor 422 may provide a set of instructions that, when executed by a processor, edit document data received by the cloud web service handler 420 from the cloud service interface 410. For example, the cloud document editor 422 may add or remove content from document data received from an image forming device or a terminal device (e.g., add a text box within a PDF, add page numbers, and/or add or remove pages). Editing the document may alternatively include cropping the document data, rotating the document data, or enhancing the document data (e.g., by enhancing the dynamic range of various colors within the document data). Other document edits may be performed by the cloud document editor 422 in various embodiments. Further, the cloud document editor 422 may provide standardized document editing tools, such as those provided by Microsoft Word®, Microsoft Excel®, or Microsoft PowerPoint®.

The cloud device rendered document handler 423 may provide a service for uploading document data rendered by a device (e.g., an image forming device or a terminal device) to a cloud server. This rendered document data can be later reused. For example, if a terminal device sends repeated printing requests, which request the same document data, to an image forming device, rather than re-rendering the document data each time, the image forming device could instead download a previously rendered copy of the document data from the cloud server to improve efficiency of printing. Further, such rendered document data could be evaluated to determine document data quality (i.e., a quality assurance comparison could be performed) by the cloud service.

The cloud quality assurance handler 424 may provide a set of instructions that, when executed by a processor, compare two or more sets of document data (e.g., document data provided by an image forming device and reference document data) to evaluate the document quality of at least one of the sets of document data. For instance, an image forming device may have a standardized document (i.e., a model document) that is used to calibrate the device. Such a standardized document may represent the reference document data. Further, such a standardized document may be periodically compared against document data generated by the image forming device to perform document quality assurance. Comparisons by the cloud quality assurance handler 424 may include byte-wise comparisons (e.g., using a comparator), comparisons of other data lengths within the document data (e.g., bit-wise comparisons), or aggregate comparisons of metadata relating to the document data (e.g., document data size comparisons or document data color depth comparisons).

In alternate embodiments, the reference document data may represent document data of an image forming device prior to an upgrade (e.g., an update to the firmware). That reference document data may then be compared against document data generated by the image forming device after the upgrade to evaluate document quality and provide assurance that the upgrade did not cause a degradation in document quality generated by the image forming device.

In still further embodiments, the reference document data may be document data generated at one point in a rendering pipeline (e.g., a printing pipeline within an image forming device), and the document data that is compared to the reference document data may be document data generated at a second point in the rendering pipeline. Such snapshots of different stages of a rendering pipeline can assist in pinpointing a stage at which an error, if any, occurs within the rendering pipeline (i.e., diagnosing issues within a rendering pipeline can be readily performed using the cloud quality assurance handler 424). As one example, the reference document data may correspond to document data taken from a rasterization stage of a document within a printing pipeline and the document data against which it is compared is document data from a halftone stage of the printing pipeline.

Further additional sources of document data and reference document data are also possible. For example, the document data and/or reference document data may be transmitted from a terminal device to the cloud server without use of the image forming device.

The other web services 425 may provide a set of instructions that, when executed by a processor, allows the cloud service to perform additional actions on or with document data (e.g., document data sent from a terminal device or an image forming device). For example, the other web services 425 may allow publication of the document data to a website (e.g., hosted by a cloud web server). Additionally or alternatively, the other web services 425 may include a search ability such that a specific set of document data (e.g., stored within the cloud server 108) could be searched for and downloaded (e.g., by a terminal device or an image forming device). Additional web services may be possible within the other web services 425.

The cloud BLOB handler 430 may be used by the cloud web service handler 420 to upload data (e.g., document data) from a terminal device (e.g., the terminal device 104 illustrated in FIG. 1) or an image forming device (e.g., the image forming device 102 illustrated in FIG. 1) to the cloud server 108 or to download data (e.g., document data) from the cloud server 108 to a terminal device or an image forming device.

The image forming device setting handler 440 may be used by the cloud web service handler 420 to apply image forming device settings to document data. For example, the image forming device setting handler 440 may be used by the cloud web service handler 420 to add, remove, or modify specific attributes of document data. The document data can be modified through color conversion 441 (e.g., converting a single color within the document data to another color or a different shade of the same color), bicolor conversion 442 (e.g., converting two colors within the document data to other colors and/or to different shades of the same colors), economy printing 443 conversion (e.g., converting the document data such that it requires less ink to print), watermark printing 444 conversion (e.g., adding or removing a watermark from the document data), and multi-copy printing 445 conversion (e.g., adding a flag to the document data that indicates that multiple copies of the document data should be printed). In alternate embodiments, additional or alternative modifications within the image forming device setting handler 440 are also possible.

In some embodiments, the image forming device setting handler 440 may have different sets of settings depending on the corresponding image forming device to which the document data corresponds. For example, the image forming device setting handler 440 may not have an ability to perform color conversion 441 for document data that corresponds to an image forming device that only supports black-and-white printing. In addition, each of the subunits of the image forming device setting handler 440 may create different results depending on a type of image forming device corresponding to the document data being modified. In an example embodiment, the watermark printing 444 conversion may add a unique watermark to the document data depending on a type of image forming device used to process the corresponding document data associated with the image forming device. Device settings applied using the image forming device setting handler 440 may be applied to document data before or after it is rendered by the image forming device, for example.

III. Example Processes

Figure 5:
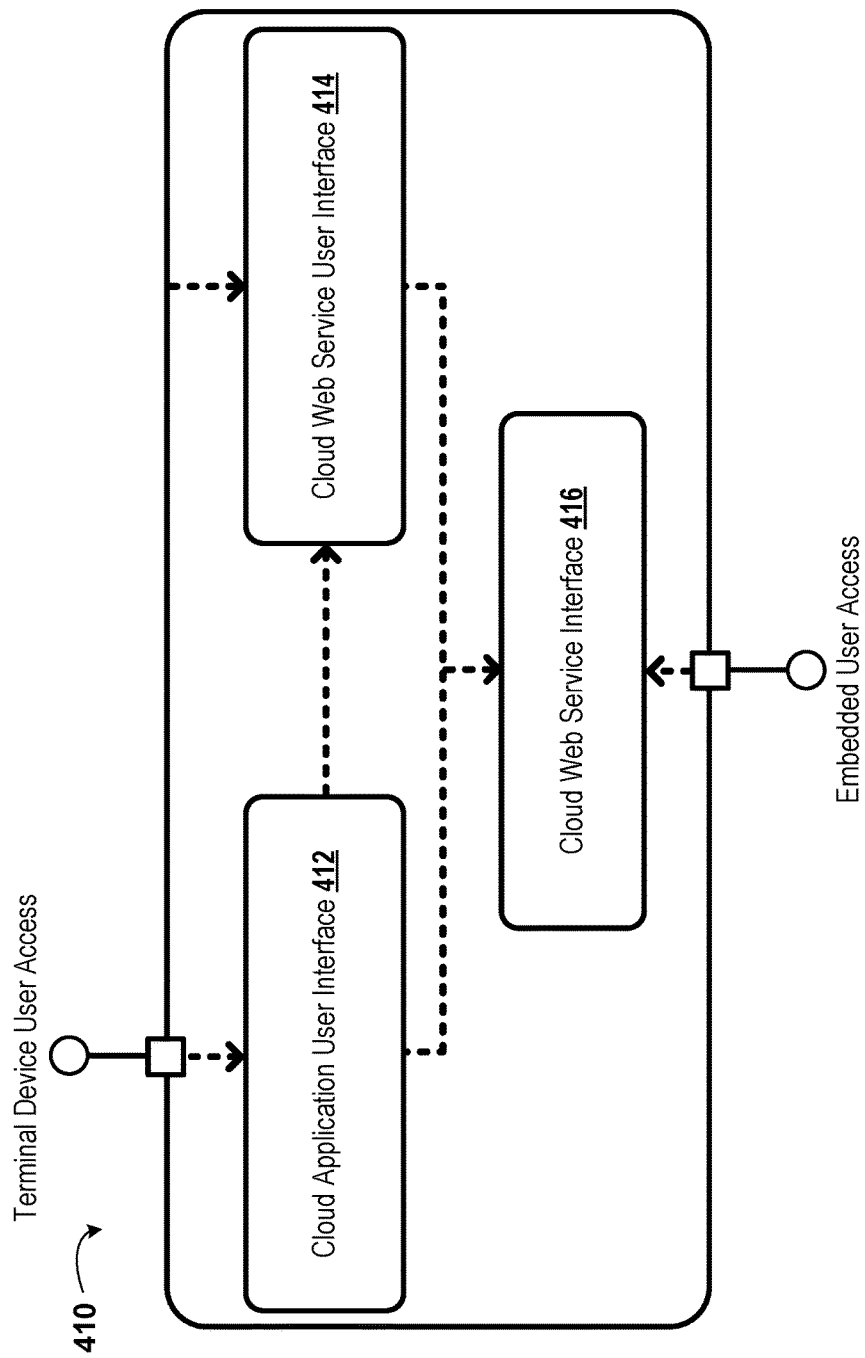
FIG. 5 is a schematic block diagram illustrating a cloud service interface, according to example embodiments.

FIG. 5 is a schematic block diagram illustrating the cloud service interface 410. The cloud service interface 410 may be a part of the cloud service 110 as illustrated in FIG. 4. The cloud service interface 410 may include a cloud application user interface 412, a cloud web service user interface 414, and a cloud web service interface 416.

As indicated in FIG. 5 via the exterior connection to the terminal device that provides user access, the cloud application user interface 412 may provide an interface through which a terminal device or an embedded user can communicate with the cloud service 110 (e.g., over the internet 106). For example, the cloud application user interface 412 may include a graphical user interface (GUI) through which a terminal device may access the cloud service 110. As illustrated, the cloud application user interface 412 may use the cloud web service user interface 414 or the cloud web service interface 416 to complete some actions (e.g., by executing a sub-method of the cloud service interface 410).

The cloud application user interface 412 may be designed for a specific medium and/or type of terminal device through which the user interacts with the cloud service 110. For example, the cloud application user interface 412 may be designed for browser-based interaction (e.g., through a web browser on a PC or a mobile computing device). Alternatively, the cloud application user interface 412 may be designed for interaction via an application (app) on a mobile computing device or tablet computing device.

The cloud web service user interface 414 may provide additional communication between the cloud service interface 410, and therefore the cloud service 110, and a user (e.g., a terminal device user). As illustrated, the cloud web service user interface 414 may use the cloud web service interface 416 to complete some actions (e.g., by containing instructions to execute a sub-method of the cloud service interface 410).

The following provides an example to illustrate a potential use of the cloud web service user interface 414. If a terminal device, accessing the cloud application user interface 412, requests (e.g., from an app) a set of document data be converted from a Joint Photographic Experts Group (JPEG) file to a PDF, a file type conversion request to the cloud web service handler 420 may be executed by the cloud web service interface 416 within the cloud service interface 410. During the file type conversion, additional conversion options may be available to a user. Such conversion options may include a resolution setting of the output file, a file location (e.g., within a cloud server) of the output file, or a compression ratio of the output file. Because of the potential for additional options, the terminal device may be prompted to answer additional questions using the cloud web service user interface 414.

Besides settings, other additional user options (e.g., how to handle time-outs or connectivity issues) may be presented by the cloud web service user interface 414 during an execution of a user instruction by the cloud application user interface 412 and/or the cloud web service interface 416. Additional or alternative sub-options may be presented for operations different from file type conversion (e.g., color conversion or watermark printing) using the cloud web service interface 416.

The cloud web service interface 416 may communicate with an embedded user (e.g., embedded software within an image forming device, such as firmware). This embedded user may be alerted, for example, during execution of an image processing method (e.g., printing) when an error occurs. For instance, if a specific stage in a printing process is taking longer than expected, it could be an indication that the previous stage of the printing process yielded an inadequate output. This could flag an embedded user of the image forming device to send a message (e.g., a quality assurance comparison request) to the cloud service 110 using the cloud web service interface 416 of the cloud service interface 410.

Further, as illustrated, the cloud web service interface 416 could be used by the cloud application user interface 412 or the cloud web service user interface 414 to perform various functions. For example, if a terminal device requests a quality assurance comparison through the cloud application user interface 412, the cloud application user interface 412 may then interface with the cloud web service interface 416 to process the quality assurance comparison request.

Figure 6:
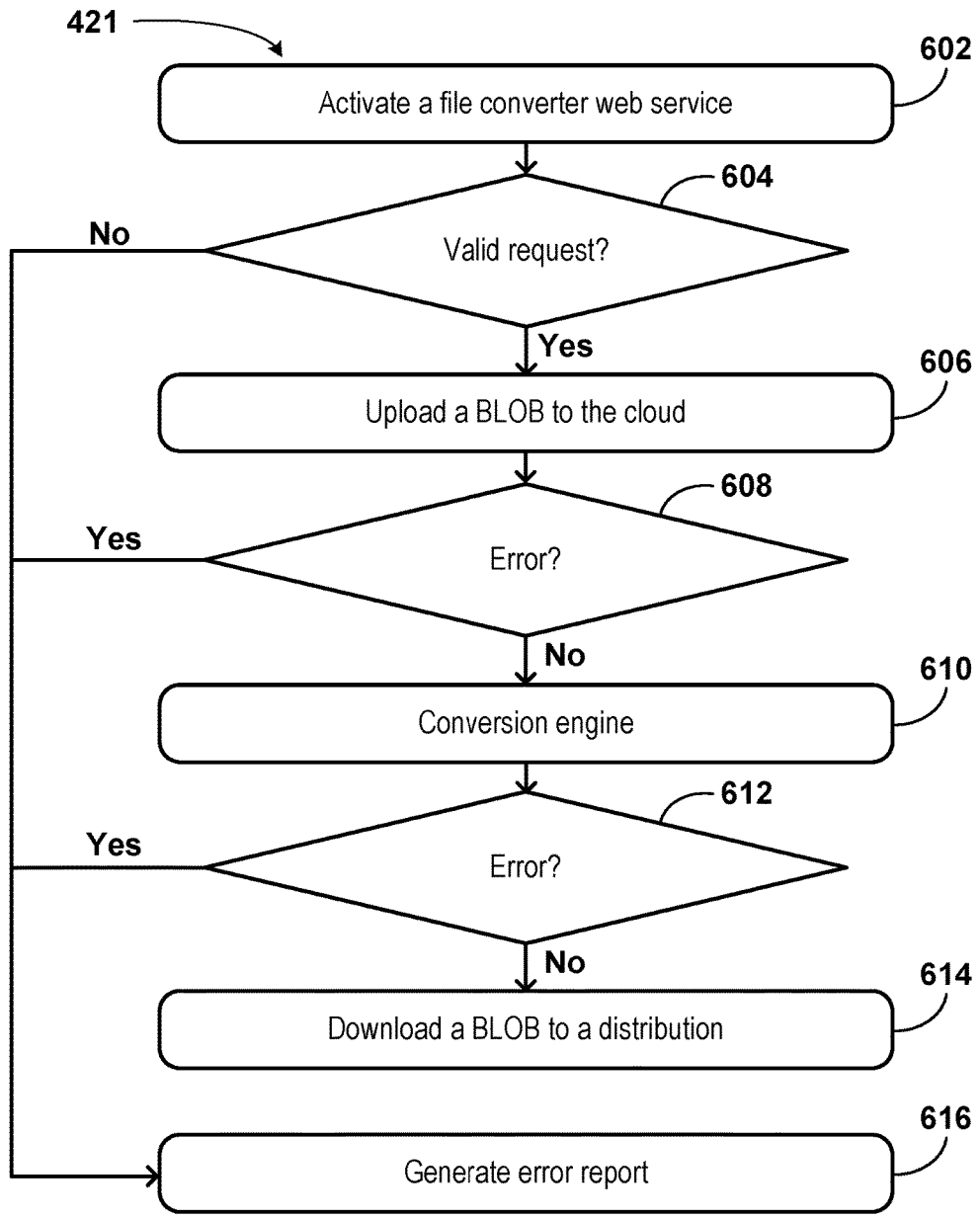
FIG. 6 is a flow chart illustrating a method, according to example embodiments.

FIG. 6 is a flow chart illustrating a method. The method may represent the cloud document converter 421 within the cloud web service handler 420. The cloud document converter 421 may provide a set of instructions that, when executed by a processor, convert document data received by the cloud web service handler 420 from the cloud service interface 410. The cloud document converter 421 may convert documents from both upstream document data and downstream document data. Upstream document data may include document data originating from a source upstream of the cloud server 108 in a potential image processing pipeline, such as from a terminal device print request. Similarly, downstream document data may include document data originating from a source downstream of the cloud server 108 in a potential image processing pipeline, such as from an embedded user (e.g., embedded software, such as firmware) within the image forming device 102.

At block 602, the cloud document converter 421 may include activating a file converter web service. In some embodiments, at block 602 the cloud document converter 421 may include loading a portion of executable instructions representing a file conversion process into a volatile memory on a cloud server (e.g., the cloud server 108 illustrated in FIG. 1). This may include transferring the instructions from a non-volatile memory to the volatile memory, for example. Additionally or alternatively, at block 602, the cloud document converter 421 may include beginning an execution of instructions representing the file converter web service using a processor.

At block 604, the cloud document converter 421 may include determining if there was a valid request received. If a valid request was received, the cloud document converter 421 may proceed to block 606. If a valid request was not received, the cloud document converter 421 may proceed to block 616.

At block 606, the cloud document converter 421 may include uploading a BLOB to the cloud. Further, at block 606, the cloud document converter 421 may employ a cloud BLOB handler (e.g., the cloud BLOB handler 430 illustrated in FIG. 4) to upload the BLOB to the cloud (i.e., transmit the BLOB to and store the BLOB within a cloud server). In addition, at block 606, the cloud document converter 421 may upload the BLOB to the cloud in multiple sections, based on an associated data block size (e.g., 8092 KB). As such, portions of the BLOB can begin to be processed (e.g., by the conversion engine 610) before the entire BLOB has been uploaded, thereby improving performance/efficiency of the cloud document converter 421.

At block 608, the cloud document converter 421 may include determining if an error has occurred. If an error has occurred, the cloud document converter 421 may proceed to block 616. If an error has not occurred, the cloud document converter 421 may proceed to block 610.

At block 610, the cloud document converter 421 may include executing a conversion engine. The conversion engine may include instructions that, when executed by a processor, convert the document data stored within the cloud server 108 from one format to another (e.g., from JPEG to PDF). The conversion engine may take the BLOB, or a portion of the BLOB, uploaded to the cloud at block 606 as an input and generate an output file with a converted format. Further, the output file may be stored within a memory of the cloud server 108.

At block 612, the cloud document converter 421 may include determining if an error has occurred. If an error has occurred, the cloud document converter 421 may proceed to block 616. If an error has not occurred, the cloud document converter 421 may proceed to block 614.

At block 614, the cloud document converter 421 may include downloading a BLOB to a distribution. Here, the distribution may correspond to a memory (e.g., a volatile memory or a non-volatile memory) of the image forming device 102 or the terminal device 104. Further, at block 614, the cloud document converter 421 may employ a cloud BLOB handler (e.g., the cloud BLOB handler 430 illustrated in FIG. 4) to download the BLOB to the distribution. In addition, at block 614, the cloud document converter 421 may download the BLOB to the distribution in multiple sections, based on an associated data block size (e.g., 8092 KB). As such, portions of the BLOB can begin to be processed (e.g., by an image processing unit, such as a printing unit, within the image forming device 102) before the entire BLOB has been downloaded, thereby improving performance and efficiency.

In alternate embodiments of the cloud document converter 421, block 614 may be omitted. For example, in some embodiments, the converted document may be stored within a memory of the cloud server 108 for later access rather than being downloaded to the distribution.

At block 616, the cloud document converter 421 may include generating an error report. The error report may include the location (e.g., block 604, block 608, or block 612) within the cloud document converter 421 at which the error occurred, a time at which the error occurred (e.g., a clock time in ms), and/or the specific type of error (e.g., "file to be converted not found"). Further, at block 616, the cloud document converter 421 may include transmitting the error report to an image forming device (e.g., the image forming device 102 illustrated in FIG. 1) or to a terminal device (e.g., the terminal device 104 illustrated in FIG. 1). Additionally or alternatively, at block 616, the cloud document converter 421 may include storing the error report within a cloud server (e.g., the cloud server 108 illustrated in FIG. 1).

Figure 7:
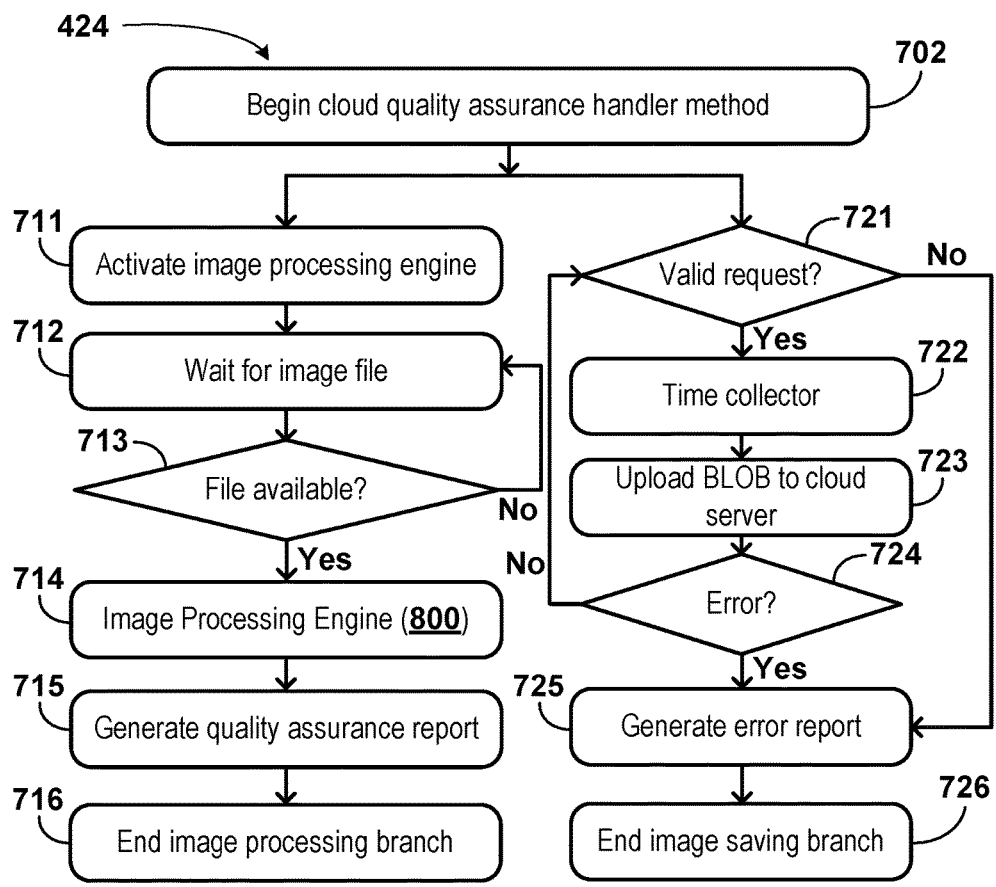
FIG. 7 is a flow chart illustrating a method, according to example embodiments.

FIG. 7 is a flow chart illustrating a method. The method may represent the cloud quality assurance handler 424. Further, the cloud quality assurance handler 424 may be activated when cloud quality assurance is requested (e.g., by a terminal device or an image forming device through the cloud service interface 410). The cloud quality assurance handler 424 may be configured to handle image data (e.g., document data) from different stages within a printing pipeline. For example, the cloud quality assurance handler 424 may be configured to save and analyze textual image data, vector image data, raster image data, image data before image forming device 102 color conversion, final image data (e.g., image data ready for printing), and post-processing image data (e.g., image data of a scanned page that was printed by the image forming device 102). Such a capability may be used by the cloud service 110 to pinpoint a stage in an image processing pipeline (e.g., the printing pipeline) at which an error occurred within an image forming device 102.

At block 702, the cloud quality assurance handler 424 method begins. In some embodiments, at block 702 the cloud quality assurance handler 424 may include loading a portion of executable instructions representing a quality assurance process into a volatile memory on a cloud server (e.g., the cloud server 108 illustrated in FIG. 1). This may include transferring the instructions from a non-volatile memory to the volatile memory, for example. Additionally or alternatively, at block 702, the cloud quality assurance handler 424 may include beginning an execution of instructions representing the quality assurance process using a processor.

From block 702, the cloud quality assurance handler 424 may proceed in parallel branches, beginning at blocks 711 and 721. The left branch represents an image processing process, while the right branch represents an image saving process. Such parallel processing may ensure that cloud image processing does not affect runtime, and therefore does not degrade image processing performance of the cloud service 110 or the image forming device 102.

At block 711, the cloud quality assurance handler 424 may include activating an image processing engine. In some embodiments, at block 711 the cloud quality assurance handler 424 may include loading a portion of executable instructions representing an image processing engine into a volatile memory on a cloud server (e.g., the cloud server 108 illustrated in FIG. 1). This may include transferring the instructions from a non-volatile memory to the volatile memory, for example. Additionally or alternatively, at block 711, the cloud quality assurance handler 424 may include beginning an execution of instructions representing the image processing engine using a processor.

At block 712, the cloud quality assurance handler 424 may include waiting for an image file (e.g., document data file). This may include using a time delay to wait for further image data to be transferred.

At block 713, the cloud quality assurance handler 424 may include determining if the image file (e.g., the document data file) is available. If the image file is available, the cloud quality assurance handler 424 may proceed to block 714. If the image file is not available, the cloud quality assurance handler 424 may return to block 712. At block 713, the cloud quality assurance handler 424 may include monitoring a buffer having a corresponding block size to determine if the buffer is full. In alternate embodiments, at block 713, the cloud quality assurance handler 424 may determine if a portion of the file is available for conversion. As described above, the file conversion of the document data may occur in multiple sections, based on an associated data block size, to improve efficiency of the conversion and prevent bottlenecking of the image rendering pipeline (e.g., printing pipeline) of the image forming device 102.

At block 714, the cloud quality assurance handler 424 may include executing an image processing engine 800 subroutine. The image processing engine 800 may generate a quality assurance result based on a comparison of the document data (e.g., the image file or a portion of the image file) with reference document data.

At block 715, the cloud quality assurance handler 424 may include generating a quality assurance report. The quality assurance report may be based on one or more of the quality assurance results generated by the image processing engine 800 subroutine. The quality assurance report may be a file that includes a list of one or more of the quality assurance results. For example, the quality assurance report may be a text file (e.g., .rtf or .txt) that lists each comparison of data-segments (e.g., bytes) of the image file and the reference document data. If the quality assurance result showed that the respective data-segments from each source (both the image file and the reference document data) were equivalent, that may be indicated by a first symbol (e.g., a character, word, bit, or byte), such as a "0" or "null". Where the quality assurance result showed that respective data-segments from each source were not equivalent, a second symbol may be used, such as a "1" or "NG" (representing a "not good" state). In other embodiments, the quality assurance report may list only those comparisons that yielded negative quality assurance results (i.e., non-equivalent comparison results). Other formats of the quality assurance report are also possible.

In addition, at block 715, the cloud quality assurance handler 424 may include saving the quality assurance report in a memory of the cloud server 108. Further, in some embodiments, generating the quality assurance report may include transmitting the quality assurance report to the terminal device 104 (e.g., via the cloud web service interface 416) or the image forming device 102 (e.g., via the cloud application user interface 412).

At block 716, the cloud quality assurance handler 424 may include ending the image processing branch (i.e., the left branch) of the parallel execution. This may include returning (e.g., within the cloud service 110) from a sub-method of the cloud quality assurance handler 424 to a primary method of the cloud quality assurance handler 424, for example.

At block 721, the cloud quality assurance handler 424 may include determining if a valid request has been received. If a valid request has been received, the cloud quality assurance handler 424 may proceed to block 722. If a valid request has not been received, the cloud quality assurance handler 424 may proceed to block 725.

At block 722, the cloud quality assurance handler 424 may include executing a time collector. The time collector may record a current clock time (e.g., in ms) and, later, compare the recorded clock time to a future clock time to determine the duration of an operation. For example, the time collector may act to determine the duration of the cloud quality assurance handler 424 performing one or more quality assurance comparisons. This duration may later be analyzed to monitor quality assurance performance (e.g., to monitor quality assurance efficiency in comparisons per second).

At block 723, the cloud quality assurance handler 424 may include uploading a BLOB to the cloud server (e.g., the cloud server 108 illustrated in FIG. 1). Uploading the BLOB to the cloud server 108 may include the cloud quality assurance handler 424 using the cloud BLOB handler 430 to upload the BLOB. Further, uploading the BLOB to the cloud server 108 may include storing the BLOB within a memory of the cloud server 108 (e.g., a non-volatile memory of the cloud server 108).

At block 724, the cloud quality assurance handler 424 may include determining if an error has occurred. If an error has occurred, the cloud quality assurance handler 424 may proceed to block 725. If an error has not occurred, the cloud quality assurance handler 424 may return to block 721. The first portion of the right parallel branch (i.e., blocks 721-724) may be repeated until all image data (e.g., document data) to be evaluated is uploaded to the cloud server 108.

At block 725, the cloud quality assurance handler 424 may include generating an error report. The error report may include the location (e.g., block 721 or block 724) within the cloud quality assurance handler 424 at which the error occurred, a time at which the error occurred (e.g., a clock time in ms), and/or the specific type of error (e.g., "image file to be uploaded not found"). Further, at block 725, the cloud quality assurance handler 424 may include transmitting the error report to an image forming device (e.g., the image forming device 102 illustrated in FIG. 1) or to a terminal device (e.g., the terminal device 104 illustrated in FIG. 1). Additionally or alternatively, at block 725, the cloud quality assurance handler 424 may include storing the error report within a cloud server (e.g., the cloud server 108 illustrated in FIG. 1).

At block 726, the cloud quality assurance handler 424 may include ending the image saving branch (i.e., the right branch) of the parallel execution. This may include returning (e.g., within the cloud service 110) from a sub-method of the cloud quality assurance handler 424 to a primary method of the cloud quality assurance handler 424, for example.

Figure 8:
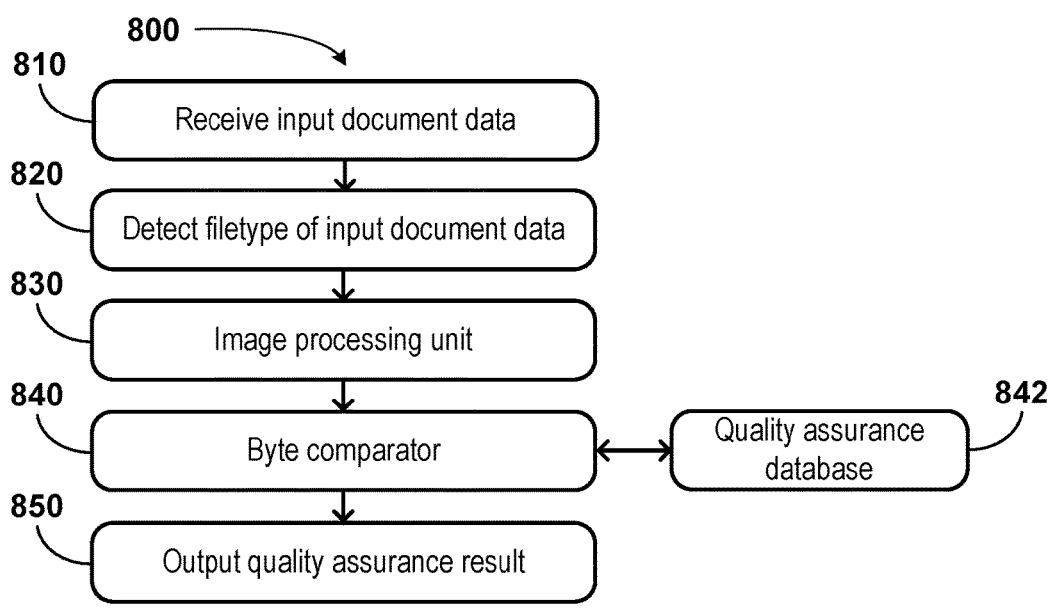
FIG. 8 is a flow chart illustrating a method, according to example embodiments.

FIG. 8 is a flow chart illustrating a method. The method may represent the image processing engine 800 subroutine of the cloud quality assurance handler 424 illustrated and described with reference to FIG. 7. Further, the image processing engine 800 subroutine may be performed on a separate thread of a processing unit (e.g., a separate thread of the CPU of the cloud server 108) than other tasks of the cloud service 110. Thus, the performance of the image processing engine 800 subroutine may not adversely affect image forming performance (e.g., when the cloud service 110 is being used by an image forming device to perform an image forming task in parallel with the quality assurance task).

At block 810, the image processing engine 800 may include receiving input document data. The input document data may be received from an image forming device (e.g., the image forming device 102 illustrated in FIG. 1) or from a terminal device (e.g., the terminal device 104 illustrated in FIG. 1). The input document data may correspond to various stages within an image processing pipeline (e.g., printing pipeline). For example, the input document data may be unprocessed data (i.e., raw image data) or partially processed data (e.g., rasterized image data), in various embodiments. Further, receiving the input document data may include storing the input document data in a memory (e.g., a volatile memory or a non-volatile memory) of a cloud server (e.g., the cloud server 108 illustrated in FIG. 1).

At block 820, the image processing engine 800 may include detecting a file type of the input document data. The file type may be a proprietary file type associated with the image forming device, in some embodiments. Alternatively, the file type may be a ubiquitous file type (e.g., bitmap, Portable Network Graphics—PNG, PDF, or JPEG).

At block 830, the image processing engine 800 may include executing an image processing unit. The image processing unit may modify the input document data in various ways, such that a meaningful comparison between the input document data and reference document data (e.g., standardized reference document data) can be performed. For example, the image processing unit may perform rotation, endian switching, header removal, or resolution change on the input document data. Other modifications to the input document data by the image processing unit are also possible in various embodiments. The modified document data may be stored by the image processing engine 800 within the cloud server 108, in some embodiments. Further, in some embodiments, no modification of the input document data may be necessary to perform a comparison, and thus the image processing unit does not modify the input document data.

At block 840, the image processing engine 800 may include executing a byte comparator. The byte comparator may compare the modified (or un-modified) input document data with reference document data to evaluate document quality of the input document data. In some embodiments, the reference document data may be stored within a quality assurance database 842 (e.g., a section of a volatile or non-volatile memory of the cloud server 108 corresponding to reference document data). As such, block 840 may include communication with (e.g., sending data to or receiving data from) the quality assurance database 842. In alternate embodiments, the quality assurance database 842 may be stored within a memory of the image forming device 102, a memory of the terminal device 104, or within a memory of a separate cloud server.

In alternate embodiments, the byte comparator of block 840 may be replaced or supplemented by alternate comparators. For example, rather than a byte-wise comparison, a bit-wise or other data-segment length comparison may be performed. Further, alternate comparisons may also be performed, such as a comparison of file size of the input document data to the reference document data.

At block 850, the image processing engine 800 may include outputting one or more quality assurance results. As described and illustrated with respect to FIG. 7, multiple quality assurance results may be aggregated into a single quality assurance report by the cloud quality assurance handler 424. Outputting the quality assurance result may include returning a value or set of values from the image processing engine 800 to the cloud quality assurance handler 424, for example. Such values may indicate whether the corresponding byte comparison (or other comparison, in some embodiments) yielded an equivalent result between the input document data and the reference document data (e.g., a "0" indicates that the input document data and the reference document data were equivalent for a given byte, whereas a "1" indicates that the input document data and the reference document data were not equivalent for the given byte).

Figure 9:
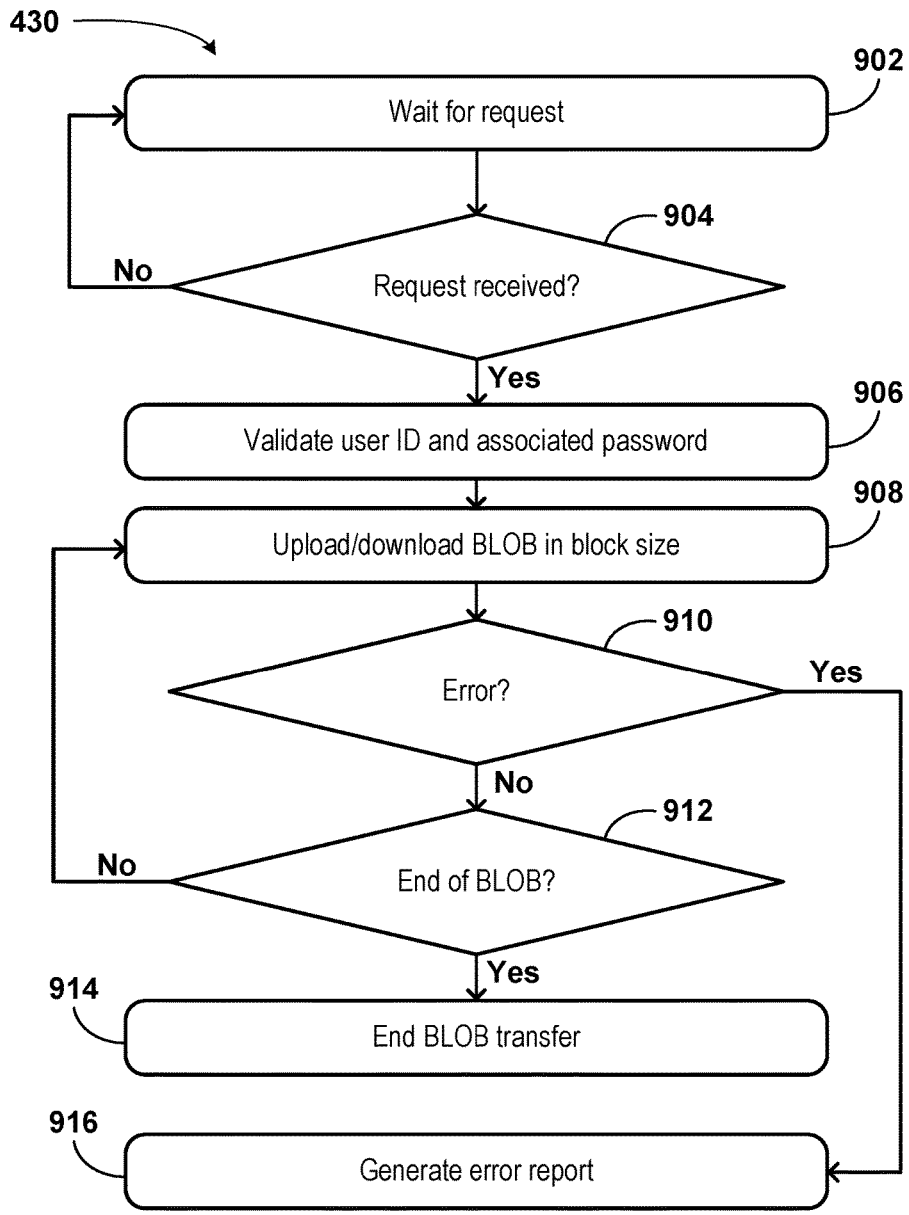
FIG. 9 is a flow chart illustrating a method, according to example embodiments.

FIG. 9 is a flow chart illustrating a method. The method may represent the cloud BLOB handler 430 of the cloud service 110 illustrated and described with respect to FIG. 1 and FIG. 4. Further, the method illustrated in FIG. 9 may be performed to transfer (e.g., upload or download) data (e.g., document data) to/from a cloud server (e.g., the cloud server 108 illustrated in FIG. 1).

At block 902, the cloud BLOB handler 430 may include waiting for a request. The request for which the cloud BLOB handler 430 is waiting may be an upload/download request issued by the cloud web service handler 420, for example. Such a request may originate from an image forming device (e.g., the image forming device 102 illustrated in FIG. 1) or a terminal device (e.g., the terminal device 104 illustrated in FIG. 1).

At block 904, the cloud BLOB handler 430 may include determining whether a request has been received. If a request has been received, the cloud BLOB handler 430 may proceed to block 906. If a request has not been received, the cloud BLOB handler 430 may return to block 902.

At block 906, the cloud BLOB handler 430 may include validating a user identification (ID) and associated password. Validating a user ID and associated password may include comparing a pairing of a user ID and password of a prospective login with a user database within a cloud server (e.g., the cloud server 108 illustrated in FIG. 1). Further, in various alternate embodiments, if the user ID and associated password are not successfully validated, the cloud BLOB handler 430 may return to block 902, may proceed to block 916, or may cease execution.

At block 908, the cloud BLOB handler 430 may include uploading and/or downloading a BLOB in increments corresponding to a given block size. Block 908 may include the cloud BLOB handler 430 transmitting or receiving the BLOB to and/or from one or more of the following: a terminal device, an image forming device, or a cloud server. Further, block 908 may include the cloud BLOB handler 430 opening a file to which the BLOB handler 430 can write the BLOB.

At block 910, the cloud BLOB handler 430 may include determining if an error has occurred. If an error has occurred, the cloud BLOB handler 430 may proceed to block 916. If an error has not occurred, the cloud BLOB handler 430 may proceed to block 912.

At block 912, the cloud BLOB handler 430 may include determining if the end of the BLOB has been reached. If the end of the BLOB has been reached, the cloud BLOB handler 430 may proceed to block 914. If the end of the BLOB has not been reached, the cloud BLOB handler 430 may return to block 908.

At block 914, the cloud BLOB handler 430 may include ending the transfer of the BLOB. Block 914 may include the cloud BLOB handler 430 closing a file to which the BLOB handler 430 writes during block 908.

At block 916, the cloud BLOB handler 430 may include generating an error report. The error report may include a time at which the error occurred (e.g., a clock time in ms), and/or a specific type of error (e.g., "file buffer overflow"). Further, at block 916, the cloud BLOB handler 430 may transmit the error report. The error report may be transmitted to a cloud server, a terminal device, and/or an image forming device, in various embodiments.

Figure 10:
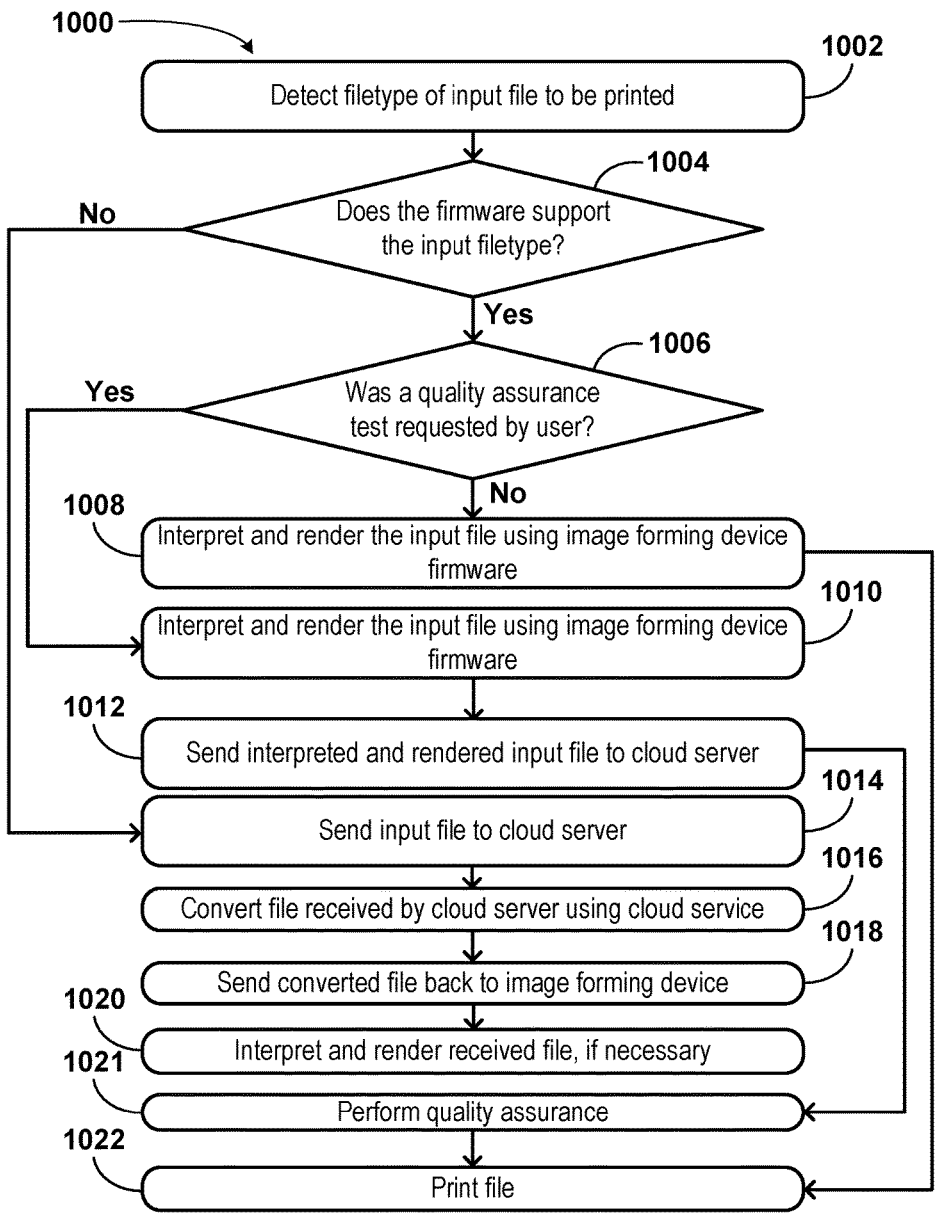
FIG. 10 is a flow chart illustrating a method, according to example embodiments.

FIG. 10 is a flow chart illustrating a method 1000. The method may represent, in part, instructions of the firmware 305 within the memory 304 of the image forming device 102 illustrated and described with reference to FIG. 3. The instructions of the firmware 305, for example, may be executed by a processing unit to perform the method 1000 illustrated in FIG. 10.

At block 1002 of the method 1000, the firmware 305 may include instructions to detect a file type of an input file to be printed. In some embodiments, the input file may be document data received by the image forming device 102 from a cloud server (e.g., the cloud server 108 illustrated in FIG. 1) or from a terminal device (e.g., the terminal device 104 illustrated in FIG. 1).

At block 1004 of the method 1000, the firmware 305 may include instructions to determine whether the firmware 305 supports the input file type detected in block 1002. Supporting the input file type may include the ability of the firmware 305 to modify and/or process the input file type. If the firmware 305 does support the input file type detected, the firmware 305 may include instructions to proceed to block 1006. If the firmware 305 does not support the input file type detected, the firmware 305 may include instructions to proceed to block 1014.

At block 1006 of the method 1000, the firmware 305 may include instructions to determine whether a quality assurance test was requested by a user. Determining whether a quality assurance test was requested by a user may correspond to the firmware 305 determining if a quality assurance request was received from the terminal device 104. A quality assurance request may be received from the terminal device 104, for example, when the firmware 305 has recently been updated, or when software of the terminal device 104 has recently been updated. If a quality assurance test was requested by a user, the firmware 305 may include instructions to proceed to block 1010. If a quality assurance test was not requested by a user, the firmware 305 may include instructions to proceed to block 1008.

At block 1008 of the method 1000, the firmware 305 may include instructions to interpret and/or render the input file using the firmware 305. This may include interpreting and rendering the input file to a first stage of a printing pipeline (e.g., a rasterization stage). Additionally, at block 1008, the firmware 305 may include instructions to proceed to block 1022.

At block 1010 of the method 1000, the firmware 305 may include instructions to interpret and/or render the input file using the firmware 305. This may include interpreting and rendering the input file to a second stage of a printing pipeline (e.g., a halftone stage).

In some embodiments, the first stage of block 1008 and the second stage of block 1010 may be the same stage in an image processing pipeline (e.g., a printing pipeline). Further, the interpreting and/or rendering performing in blocks 1008 and 1010 may be the same or different. For example, the interpreting and/or rendering in block 1008 may prepare the input file for printing in block 1022, while the interpreting and/or rendering in block 1010 may prepare the input file for transmission to and/or quality assurance by the cloud server 108/cloud service 110, as in blocks 1012 and 1021.

At block 1012 of the method 1000, the firmware 305 may include instructions to send an interpreted and/or rendered input file to a cloud server (e.g., the cloud server 108 illustrated in FIG. 1). Further, upon receiving the interpreted and/or rendered input file, the cloud server 108 may store the interpreted and/or rendered input file within a memory (e.g., a non-volatile memory) of the cloud server 108. Additionally at block 1012, the firmware 305 may include instructions to proceed to block 1021. Block 1012 may include using the cloud BLOB handler 430 as illustrated in FIG. 9 to upload the interpreted and/or rendered input file to the cloud server 108.

At block 1014 of the method 1000, the firmware 305 may include instructions to send the input file to a cloud server (e.g., the cloud server 108 illustrated in FIG. 1). Further, upon receiving the input file, the cloud server 108 may store the input file within a memory (e.g., a non-volatile memory) of the cloud server 108. Block 1014 may include using the cloud BLOB handler 430 as illustrated in FIG. 9 to upload the input file to the cloud server 108.

At block 1016, the method 1000 may include converting the input file received by the cloud server using a cloud service (e.g., the cloud service 110 illustrated and described with respect to FIG. 1 and FIG. 4).

At block 1018, the method 1000 may include sending, by the cloud server 108, for example, the converted file back to the image forming device 102 and/or to the terminal device 104. Further, block 1018 may include saving the converted file in a memory of the image forming device 102 and/or a memory of the terminal device 104.

At block 1020 of the method 1000, the firmware 305 may include instructions to interpret and/or render the received file. Such an interpretation and/or rendering of the received file may not be necessary if the received file is already in a format which can be processed by the image forming device 102 (e.g., if the received file is in a fully rendered format that can be printed by the image forming device 102).

At block 1021, the method 1000 may also include performing quality assurance on the input file received by the cloud server using the cloud service. Quality assurance may be performed using the cloud quality assurance handler 424 of the cloud service 110 as illustrated in FIG. 4, FIG. 7, and FIG. 8. In some embodiments, block 1021 may include sending a quality assurance report to the image forming device 102 and/or the terminal device 104.

At block 1022 of the method 1000, the firmware 305 may include instructions to print (or otherwise process) the file (either the interpreted and/or rendered received file as results from block 1021 or the interpreted and/or rendered input file as results from block 1008).

Figure 11A:
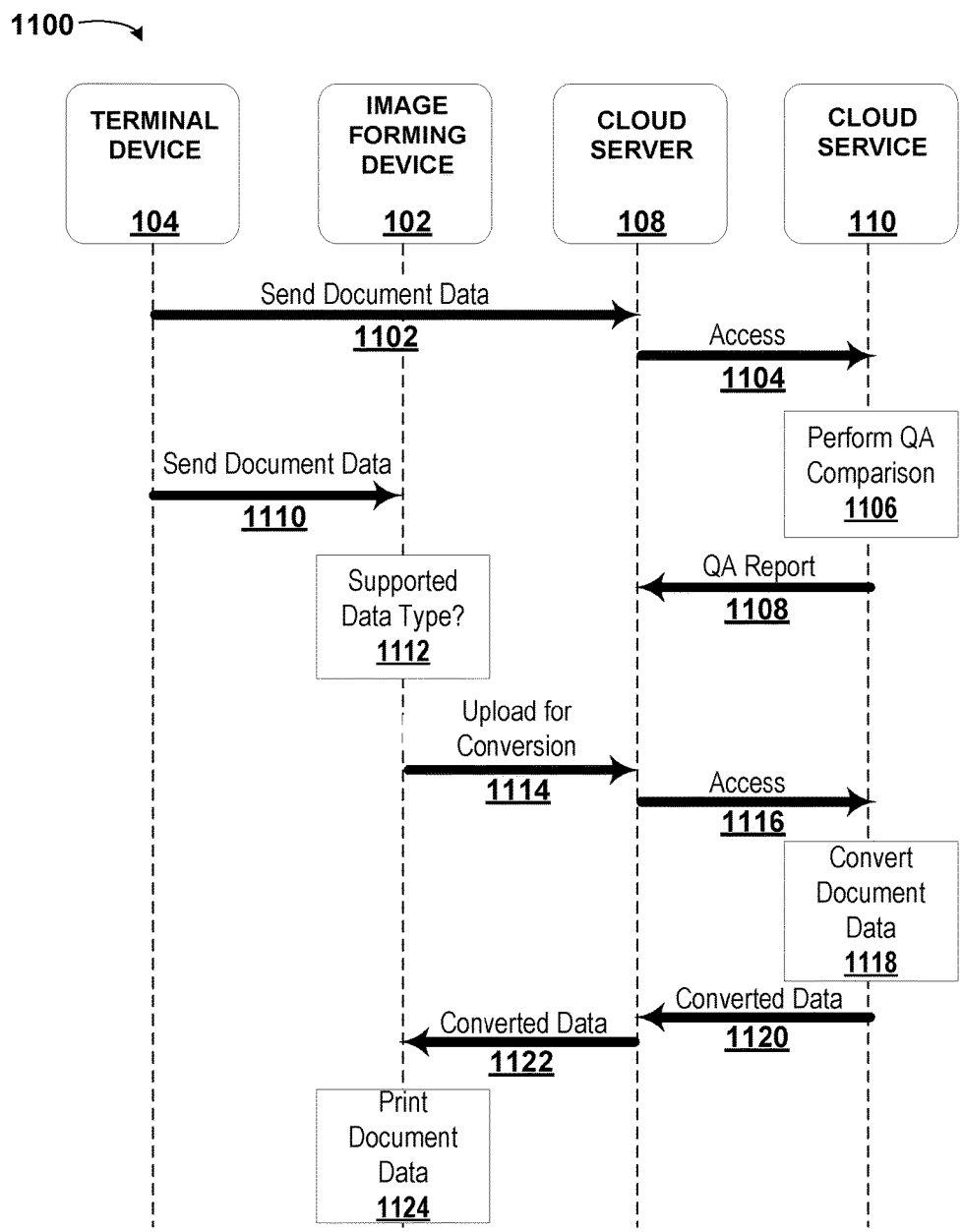
FIG. 11A is a data flow diagram illustrating a method, according to example embodiments.

FIG. 11A is a data flow diagram illustrating a method 1100. The method 1100 may include communications between components of an image forming system (e.g., the image forming system 100 illustrated and described with reference to FIG. 1, including the terminal device 104, the image forming device 102, the cloud server 108, and the cloud service 110). Further, FIG. 11A may represent a flow of data and associated actions resulting from an execution of a set of instructions by a processing unit to perform at least some of the operations illustrated in FIG. 10 (e.g., a subset of the blocks illustrated in FIG. 10).

Further, two or more of the operations illustrated in FIG. 11A may occur in parallel. This may increase the efficiency of the method 1100. For example, operations 1102, 1104, 1106, and 1108 may occur in parallel with operations 1110, 1112, and 1114. In such an embodiment, the quality assurance operations may be performed simultaneously with the operations used to determine if the document data is to be converted to a different data type.

At operation 1102, the method 1100 includes the terminal device 104 transmitting document data to the cloud server 108. Upon receiving the document data, the cloud server 108 may store the document data within a memory (e.g., a non-volatile memory) of the cloud server 108. Operation 1102 may include using the cloud BLOB handler 430 as illustrated in FIG. 9 to transmit the document data to the cloud server 108.

At operation 1104, the method 1100 includes the cloud server 108 accessing the cloud service 110. Accessing the cloud service 110 may include the cloud server 108 executing a set of instructions stored within a memory of the cloud server 108 using a processing unit of the cloud server 108. Alternately, accessing the cloud service 110 may include the cloud server 108 communicating with one or more additional cloud servers or other devices that host the cloud service 110 over the Internet.

At operation 1106, the method 1100 includes the cloud service 110 performing a quality assurance comparison. In some embodiments, the quality assurance comparison may be carried out by the cloud quality assurance handler 424 illustrated in FIG. 4 according to the methods illustrated in FIG. 7 and FIG. 8.

At operation 1108, the method 1100 includes the cloud service 110 transmitting a quality assurance report to the cloud server 108. Operation 1108 may be performed according to block 715 of the cloud quality assurance handler 424 illustrated in FIG. 7, for example. Further, in some embodiments, operation 1108 may be performed using the cloud service interface 410 of the cloud service 110 illustrated in FIG. 4. Operation 1108 may also include storing the quality assurance report within a memory of the cloud server 108. In alternate embodiments, the quality assurance report may additionally or alternatively be transmitted to the image forming device 102 and/or the terminal device 104.

At operation 1110, the method 1100 includes the terminal device 104 transmitting the document data to the image forming device 102. In various embodiments, operation 1110 may occur at various points within method 1100 (e.g., before or concurrently with operation 1102, operation 1104, operation 1106, or operation 1108). For example, the terminal device 104 may send document data to the image forming device 102 for processing (e.g., printing) before transmitting the document data to the cloud server 108 (i.e., operation 1110 may occur before operation 1102). Upon receiving the document data, the image forming device 102 may store the document data within a memory (e.g., a non-volatile memory) of the image forming device 102.

At operation 1112, the method 1100 includes the image forming device 102 determining, by the image forming device 102, if the received document data is of a data type (e.g., a file type) that is supported by the image forming device 102. Operation 1112 may include determining if the document data is of a data type supported by a firmware of the image forming device 102 and/or image rendering components (e.g., printing components) of the image forming device 102. If the determination is made that the received document data is not of a data type supported by the image forming device 102 (as may be the case in the embodiment illustrated in FIG. 11A), the document data may be sent to the cloud server 108 for conversion.

Figure 11B:
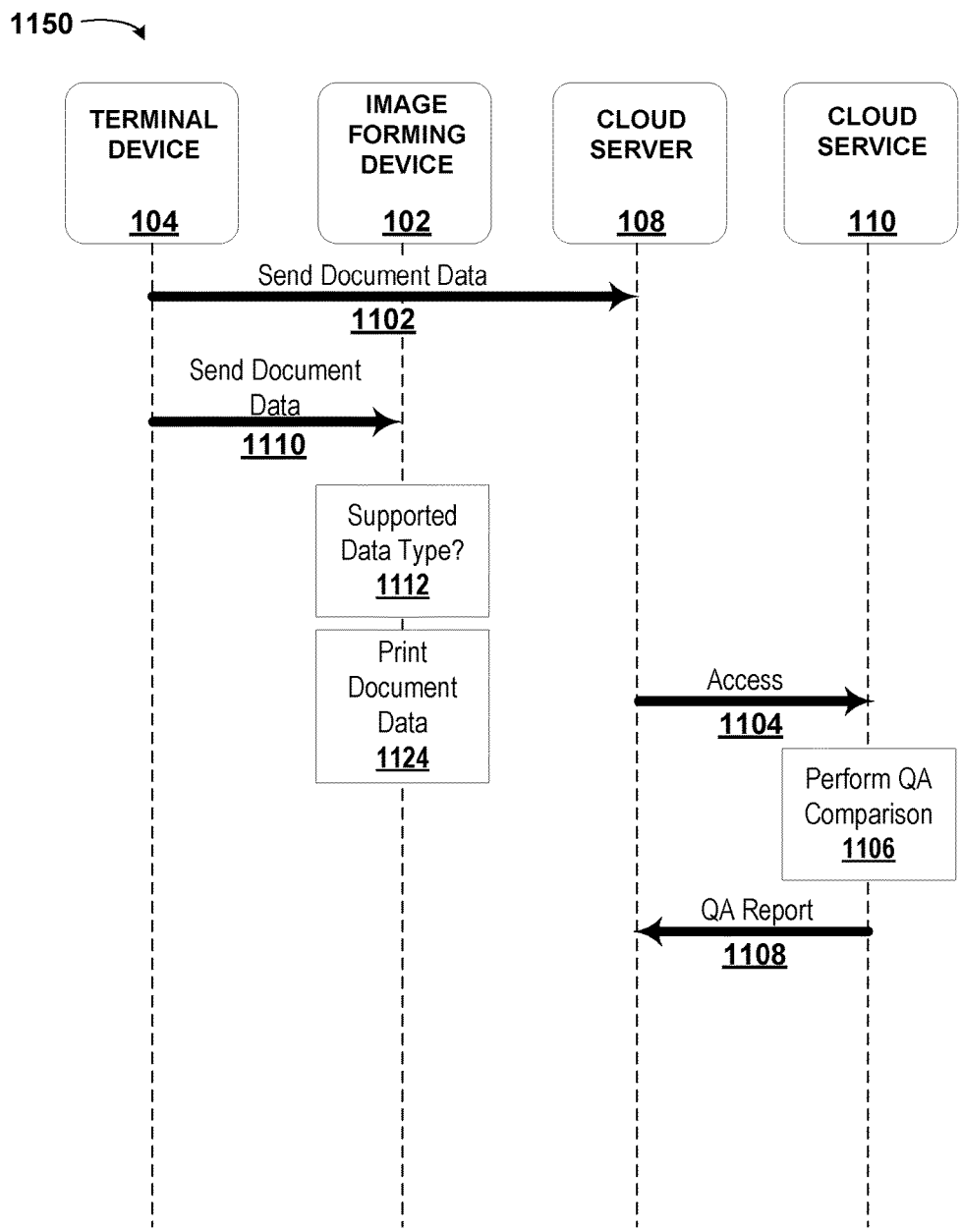
FIG. 11B is a data flow diagram illustrating a method, according to example embodiments.

However, in embodiments where the document data is of a data type supported by the image forming device 102, the image forming device 102 may proceed with processing (e.g., printing) the document data rather than transmitting the document data to the cloud server 108. This is illustrated in the embodiment of FIG. 11B.

At operation 1114, the method 1100 includes the image forming device 102 uploading the document data to the cloud server 108 for conversion. Upon receiving the document data, the cloud server 108 may store the interpreted and rendered input file within a memory (e.g., a non-volatile memory) of the cloud server 108. Operation 1114 may include using the cloud BLOB handler 430 as illustrated in FIG. 9 to transmit the document data to the cloud server 108.

At operation 1116, the method 1100 includes the cloud server 108 accessing the cloud service 110. Accessing the cloud service 110 may include communicating the document data to the cloud service 110. Alternatively, accessing the cloud service 110 may include identifying a previously transmitted set of document data (e.g., the document data transmitted to the cloud service 110 for quality assurance purposes in operation 1104) within the cloud server 108. Accessing the cloud service 110 may occur using the cloud service interface 410 illustrated in FIG. 4, for example.

At operation 1118, the method 1100 includes the cloud service 110 converting the document data to a data type or format supported by the image forming device 102. Operation 1118 may include using a conversion engine (e.g., block 610 of the cloud document converter 421 illustrated in FIG. 6). Converting the document data 1118 may include converting the document data according to a default setting. In alternate embodiments, converting the document data 1118 may include converting the document data according to a conversion request transmitted by the image forming device 102 in operation 1114. Still further, in some embodiments, converting the document data 1118 may include converting the document data according to parameters set by the terminal device 104.

At operation 1120, the method 1100 includes the cloud service 110 transmitting the converted document data to the cloud server 108. Operation 1120 may also include storing the converted document data within the cloud server 108. In embodiments where the cloud conversion in operation 1118 manipulated document data stored within the cloud server 108, rather than communicating the document data to a third party for conversion, operation 1120 may be omitted.

At operation 1122, the method 1100 includes the cloud server 108 transmitting the converted document data to the image forming device 102. In some embodiments, the converted document data may additionally be transmitted to the terminal device 104 (e.g., by the image forming device 102 or the cloud server 108). Upon receiving the document data, the image forming device 102 may store the converted data within a memory (e.g., a non-volatile memory) of the image forming device 102. Operation 1122 may include using the cloud BLOB handler 430 as illustrated in FIG. 9 to transmit the converted data from the cloud server 108 to the image forming device 102.

In some embodiments, operations 1114, 1116, 1118, 1120, and 1122 may collectively correspond to all or some of the cloud document converter 421 illustrated in FIG. 6.

At operation 1124, the method 1100 includes the image forming device 102 printing the converted document data. In alternate embodiments, operation 1124 may be replaced or supplemented by an image processing operation other than printing (e.g., faxing).

FIG. 11B is a data flow diagram illustrating a method 1150. The method 1150 may include communications between components of an image forming system (e.g., the image forming system 100 illustrated and described with reference to FIG. 1, including the terminal device 104, the image forming device 102, the cloud server 108, and the cloud service 110). The method 1150 may be analogous to the method 1100 illustrated in FIG. 11A, with the exception that the document data sent to the image forming device 102 by the terminal device 104 in operation 1110 is supported by the image forming device 102. Thus, the operations involving conversion of the document data are omitted from method 1150, and the method 1150 proceeds directly from operation 1112 to operation 1124. As illustrated, operations 1104, 1106, 1108 may occur in parallel or subsequent to operations 1110, 1112, 1124. In various embodiments, operations 1104, 1106, 1108 may occur before, concurrently with, or after operations 1104, 1106, and 1108.

As in FIG. 11A, FIG. 11B may represent a flow of data and associated actions resulting from an execution of a set of instructions by a processing unit to perform at least some of the operations illustrated in FIG. 10 (e.g., a subset of the blocks illustrated in FIG. 10).

Figure 12:
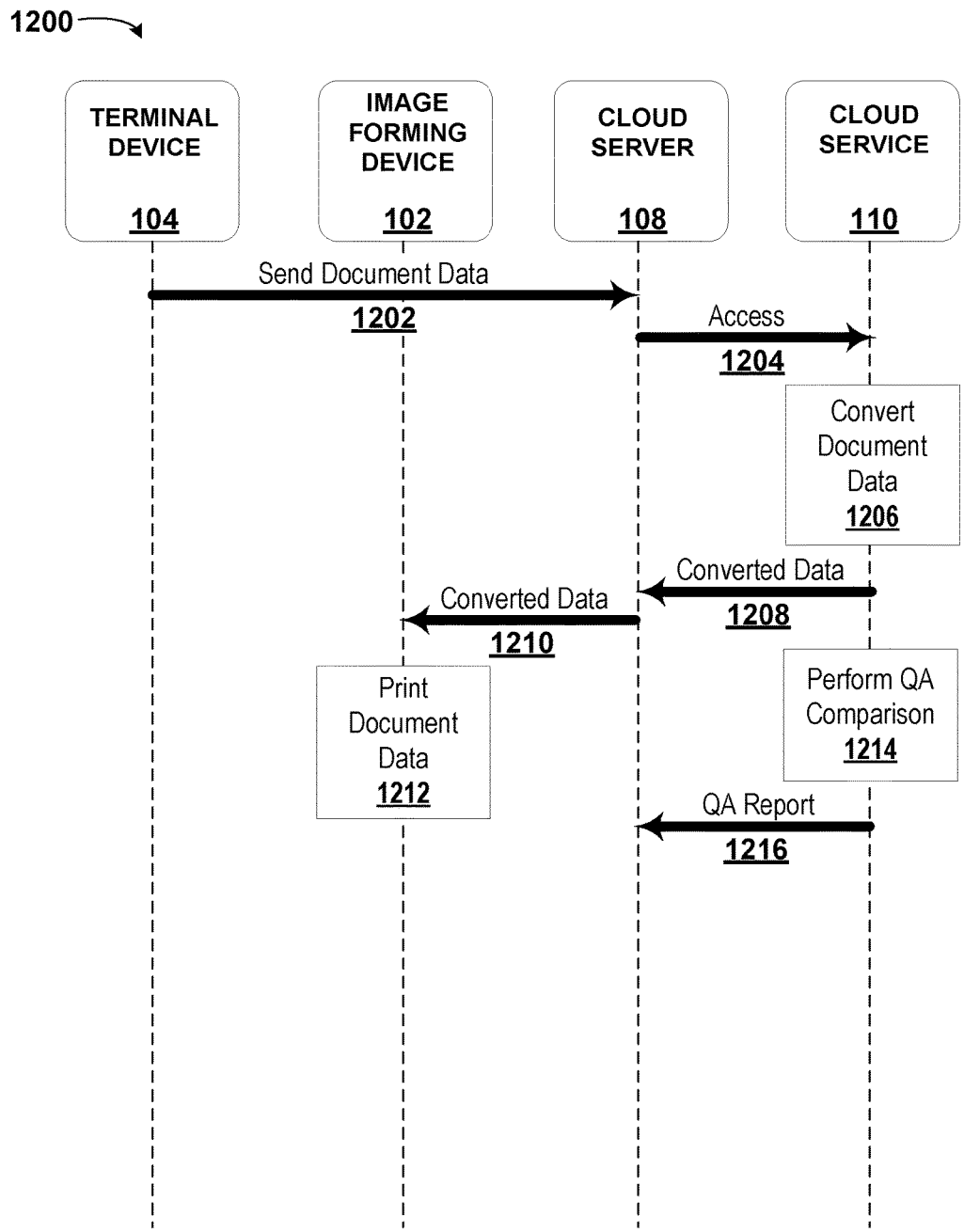
FIG. 12 is a data flow diagram illustrating a method, according to example embodiments.

FIG. 12 is a data flow diagram illustrating a method 1200. The method 1200 may include communications between components of an image forming system (e.g., the image forming system 100 illustrated and described with reference to FIG. 1, including the terminal device 104, the image forming device 102, the cloud server 108, and the cloud service 110). The method 1200 may be analogous to the method 1100 illustrated in FIG. 11A, with the exception that the document data is initially sent from the terminal device 104 to the cloud server 108 with the intention of both performing quality analysis and converting the document data to a format supported by the image forming device 102. As such, the image forming device 102 may not perform operations to determine whether the document data is supported.

At operation 1202, the method 1200 includes the terminal device 104 sending document data to the cloud server 108 for quality assurance and format conversion. Upon receiving the document data, the cloud server 108 may store the document data within a memory (e.g., a non-volatile memory) of the cloud server 108. Operation 1202 may include using the cloud BLOB handler 430 as illustrated in FIG. 9 to transmit the document data to the cloud server 108.

At operation 1204, the method 1200 includes the cloud server 108 accessing the cloud service 110. Accessing the cloud service 110 may include the cloud server 108 executing a set of instructions stored within a memory of the cloud server 108 using a processing unit of the cloud server 108. Alternately, accessing the cloud service 110 may include the cloud server 108 communicating with one or more additional cloud servers or other devices that host the cloud service 110 over the Internet.

At operation 1206, the method 1200 includes the cloud service 110 converting the document data to a data type or format supported by the image forming device 102. Operation 1206 may include using a conversation engine (e.g., block 610 of the cloud document converter 421 illustrated in FIG. 6). Converting the document data 1206 may include converting the document data according to a default setting. In alternate embodiments, converting the document data 1206 may include converting the document data according to a conversion request accompanying the image forming device 102 in operation 1202. Still further, in some embodiments, converting the document data 1206 may include converting the document data according to parameters set by the terminal device 104.

At operation 1208, the method 1200 includes the cloud service 110 transmitting the converted document data to the cloud server 108. Operation 1208 may also include storing the converted document data within a memory of the cloud server 108. In embodiments where the cloud conversion in operation 1206 manipulated document data stored within the cloud server 108, rather than communicating the document data to a third party for conversion, operation 1208 may be omitted.

At operation 1210, the method 1200 includes the cloud server 108 transmitting the converted document data to the image forming device 102. In some embodiments, the converted document data may additionally be transmitted to the terminal device 104 (e.g., by the image forming device 102 or the cloud server 108). Upon receiving the document data, the image forming device 102 may store the converted data within a memory (e.g., a non-volatile memory) of the image forming device 102. Operation 1210 may include using the cloud BLOB handler 430 as illustrated in FIG. 9 to transmit the converted data from the cloud server 108 to the image forming device 102.

At operation 1212, the method 1200 includes the image forming device 102 printing the converted document data. In alternate embodiments, operation 1212 may be replaced or supplemented by an image processing operation other than printing (e.g., faxing).

At operation 1214, the method 1200 includes the cloud service 110 performing a quality assurance comparison. The quality assurance comparison may be carried out by the cloud quality assurance handler 424 illustrated in FIG. 4 according to the methods illustrated in FIG. 7 and FIG. 8.

At operation 1216, the method 1200 includes the cloud service 110 transmitting a quality assurance report to the cloud server 108. Operation 1216 may be performed according to block 715 of the cloud quality assurance handler 424 illustrated in FIG. 7, for example. Further, in some embodiments, operation 1216 may be performed using the cloud service interface 410 of the cloud service 110 illustrated in FIG. 4. Operation 1216 may also include storing the quality assurance report within a memory of the cloud server 108. In alternate embodiments, the quality assurance report may additionally or alternatively be transmitted to the image forming device 102 and/or the terminal device 104.

In some embodiments, operations 1214 and 1216 may occur before or in parallel with operations 1204, 1206, 1208, 1210, and 1212. In such embodiments, quality assurance can take place before or in parallel with document data processing by the image forming device 102.

Figure 13:
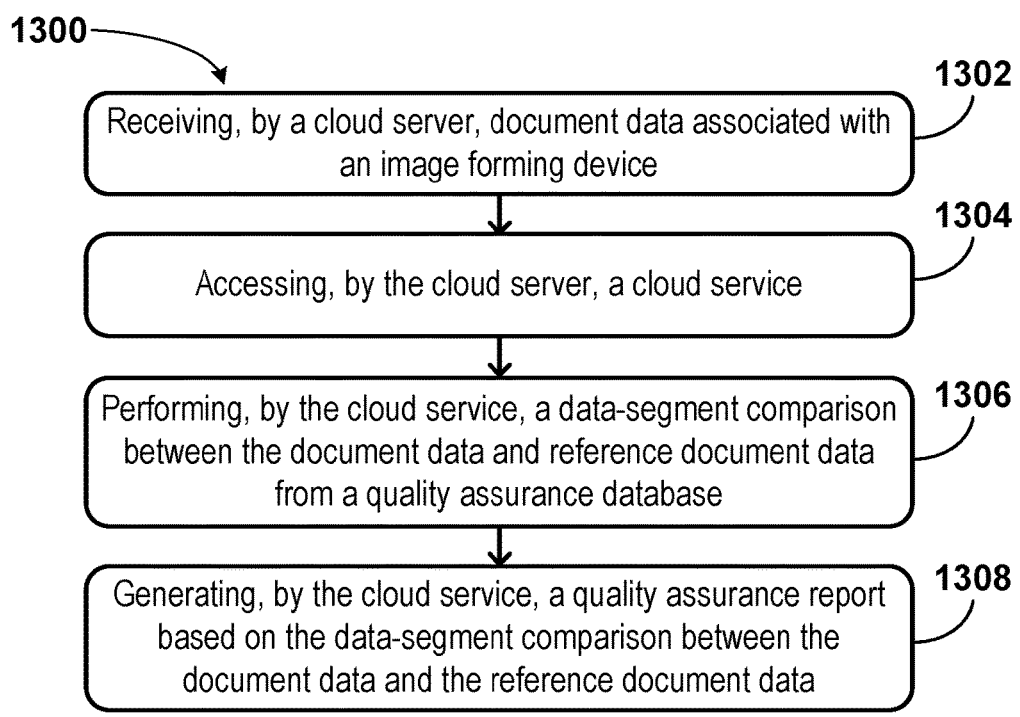
FIG. 13 is a flow chart illustrating a method, according to example embodiments.

FIG. 13 is a flow chart illustrating a method 1300. The method 1300 may be performed to evaluate document quality.

At block 1302, the method 1300 includes receiving, by a cloud server (e.g., the cloud server 108 illustrated in FIG. 1), document data associated with an image forming device (e.g., the image forming device 102 illustrated in FIG. 1). In some embodiments, the document data may have been received from the image forming device at a requested stage in a printing pipeline of the image forming device. For example, the requested stage could have been received, by the cloud server, in a stage request from a terminal device (e.g., the terminal device 104 illustrated in FIG. 1). Further, the request stage may be an interpretation stage, a graphic execution stage, a rasterization stage, a halftone stage, or a printed stage. Further, the cloud service and the cloud server may reside within a public cloud or a private cloud.

In some embodiments, the document data may be a portion of a document received by the cloud server as a binary large object (BLOB). Additionally or alternatively, the document data may include document data sent to the image forming device by a terminal device for printing. In such cases, the method 1300 may also include printing a document, by the image forming device, that correspond to the document data sent to the image forming device by the terminal device for printing. After printing the document, the method 1300 may include, in some embodiments, scanning, by the image forming device, the printed document, wherein the document data received by the cloud server corresponds to the scanned, printed document; receiving, by the cloud server, the reference document data from the image forming device; and storing, by the cloud server, the reference document data in the quality assurance database.

At block 1304, the method 1300 includes accessing, by the cloud server, a cloud service (e.g., the cloud service 110 illustrated in FIG. 1).

At block 1306, the method 1300 includes performing, by the cloud service, a data-segment comparison between the document data and reference document data from a quality assurance database.

At block 1308, the method 1300 includes generating, by the cloud service, a quality assurance report based on the data-segment comparison between the document data and the reference document data. The method 1300 may also include transmitting, by the cloud server, the quality assurance report to the image forming device and/or a terminal device. In addition, the method 1300 may include storing, within the cloud server (e.g., within a non-volatile memory of the cloud server), the quality assurance report.

In certain embodiments, the method 1300 may include determining, by the image forming device, whether the document data is in a format supported by the image forming device. Additionally, the method 1300 may include converting, by the cloud service, the document data to a format supported by the image forming device. Further, the method 1300 may include transmitting, by the cloud server, the converted document data to the image forming device. The method 1300 may also include printing, by the image forming device, the converted document data.

In other embodiments, the method 1300 may include determining, by the image forming device, whether the document data is in a format supported by the image forming device. Further, the method 1300 may include converting, by the image forming device, the document data to a format supported by the image forming device. Additionally, the method 1300 may include printing, by the image forming device, the converted document data.

In some embodiments, the method 1300 may include receiving, by the cloud server, the reference document data from a terminal device. In such cases, the method 1300 may also include storing, by the cloud server, the reference document data in the quality assurance database.

In various embodiments, the method 1300 may also include receiving, by the cloud server, a quality assurance request from a terminal device. The quality assurance request may indicate that a quality assurance test should be performed by the cloud service.

The terms "document data", "image data", "document file", and "image file" are used broadly and interchangeably within this description to describe data that can be stored in various electronic mediums, including non-transitory, computer-readable mediums. Further, "document data", "image data", "document files", and "image files" may originate from a variety of sources (e.g., cameras, scanners, websites) and be associated with a variety of file types (e.g., PDF, JPEG, PNG, etc.).

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed:

1. A method for evaluating document quality, comprising:
    receiving, by a cloud server, a stage request from a terminal device that indicates a requested stage in a printing pipeline of an image forming device;
    receiving, by the cloud server, document data associated with the image forming device, wherein the document data was received from the image forming device at the requested stage in the printing pipeline of the image forming device;
    accessing, by the cloud server, a cloud service;
    performing, by the cloud service, a comparison between the document data and reference document data from a quality assurance database; and
    generating, by the cloud service, a quality assurance report based on the comparison between the document data and the reference document data.

2. The method of claim 1, wherein the comparison between the document data and the reference document data from the quality assurance database comprises an aggregate comparison of metadata relating to the document data.

3. The method of claim 1, wherein the requested stage is an interpretation stage, a graphic execution stage, a rasterization stage, a halftone stage, or a printed stage.

4. The method of claim 1, further comprising detecting, by the cloud server, a file type of the document data.

5. The method of claim 1, wherein the document data is a portion of a document, and wherein the document data is received by the cloud server as a binary large object.

6. The method of claim 1, further comprising:
determining, by the image forming device, whether the document data is in a format supported by the image forming device;
converting, by the cloud service, the document data to a format supported by the image forming device;
transmitting, by the cloud server, the converted document data to the image forming device; and
printing, by the image forming device, the converted document data.

7. The method of claim 1, further comprising:
determining, by the image forming device, whether the document data is in a format supported by the image forming device;
converting, by the image forming device, the document data to a format supported by the image forming device; and
printing, by the image forming device, the converted document data.

8. The method of claim 1, further comprising transmitting, by the cloud server, the quality assurance report to the image forming device.

9. The method of claim 1, further comprising transmitting, by the cloud server, the quality assurance report to the terminal device.

10. The method of claim 1, further comprising storing, within the cloud server, the quality assurance report.

11. The method of claim 1, wherein the cloud server and the cloud service reside within a public cloud.

12. The method of claim 1, wherein the cloud server and the cloud service reside within a private cloud.

13. The method of claim 1, wherein the reference document data comprises document data sent to the image forming device by the terminal device for printing.

14. The method of claim 13, further comprising printing a document, by the image forming device, that corresponds to the document data sent to the image forming device by the terminal device for printing.

15. The method of claim 14, further comprising:
scanning, by the image forming device, the printed document, wherein the document data received by the cloud server corresponds to the scanned, printed document;
receiving, by the cloud server, the reference document data from the image forming device; and
storing, by the cloud server, the reference document data in the quality assurance database.

16. The method of claim 1, further comprising:
receiving, by the cloud server, the reference document data from the terminal device; and
storing, by the cloud server, the reference document data in the quality assurance database.

17. The method of claim 1, further comprising receiving, by the cloud server, a quality assurance request from the terminal device, wherein the quality assurance request indicates that a quality assurance test should be performed by the cloud service.

18. A cloud service for evaluating document quality, comprising:
a cloud service interface,
wherein the cloud service interface is configured to communicate with a cloud server to receive document data associated with an image forming device,
wherein the document data associated with the image forming device corresponds to a requested stage in a printing pipeline of the image forming device, and
wherein the requested stage in the printing pipeline of the image forming device was received, by the cloud server, in a stage request from a terminal device; and
a cloud quality assurance handler,
wherein the cloud quality assurance handler comprises an image processing engine configured to compare the document data with reference document data from a quality assurance database,
wherein the image processing engine comprises:
an image processing unit configured to modify the document data, if necessary, such that a comparison between the document data and the reference document data can be made; and
a byte comparator configured to perform the comparison between the document data and the reference document data, and
wherein the cloud service interface is further configured to communicate a result of the comparison to the cloud server as a quality assurance report.

19. The cloud service of claim 18, wherein the cloud service interface comprises a cloud web service user interface accessible by a user of the terminal device to provide quality assurance settings for use during a quality assurance process.

20. A system for evaluating document quality, comprising:
an image forming device configured to process document data;
a cloud server configured to receive document data associated with the image forming device,
wherein the document data associated with the image forming device corresponds to a requested stage in a printing pipeline of the image forming device, and
wherein the requested stage in the printing pipeline of the image forming device was received, by the cloud server, in a stage request from a terminal device; and
a cloud service, accessible by the cloud server, configured to:
perform a comparison between the document data and reference document data from a quality assurance database; and
generate a quality assurance report based on the comparison between the document data and the reference document data.

* * * * *